US012775178B2

(12) United States Patent
Chen et al.

(10) Patent No.: US 12,775,178 B2
(45) Date of Patent: Oct. 27, 2026

(54) FITTING METHODS FOR ASTIGMATIC CONTACT LENS SETS INCLUDING APODIZED SINGLE VISION LENSES FOR LOWER CYLINDER ERROR CORRECTION AND TORIC LENSES FOR HIGHER CYLINDER ERROR, AND RELATED ASTIGMATIC LENS SETS

(71) Applicant: Johnson & Johnson Vision Care, Inc., Jacksonville, FL (US)

(72) Inventors: Minghan Chen, Jacksonville, FL (US); Philippe F. Jubin, Fernandina Beach, FL (US); Giovanna O. Olivares-Petito, Jacksonville, FL (US); Ryan Sherrill, Jacksonville Beach, FL (US); Ranganath Raja, Jacksonville, FL (US); Ghulam Maharvi, Jacksonville, FL (US); Michael F. Widman, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 190 days.

(21) Appl. No.: 18/894,350

(22) Filed: Sep. 24, 2024

(65) Prior Publication Data

US 2025/0102831 A1 Mar. 27, 2025

Related U.S. Application Data

(60) Provisional application No. 63/540,159, filed on Sep. 25, 2023.

(51) Int. Cl.
*G02C 7/04* (2006.01)

(52) U.S. Cl.
CPC ............. *G02C 7/047* (2013.01); *G02C 7/048* (2013.01); *G02C 2202/08* (2013.01); *G02C 2202/22* (2013.01); *G02C 2202/24* (2013.01)

(58) Field of Classification Search
CPC .... G02C 7/047; G02C 7/048; G02C 2202/08; G02C 2202/22; G02C 2202/24
(Continued)

(56) References Cited

U.S. PATENT DOCUMENTS 5,125,728 A * 6/1992 Newman .................. G02C 7/04 351/159.22
5,662,706 A 9/1997 Legerton et al.
(Continued)

FOREIGN PATENT DOCUMENTS

EP 3104214 A1 12/2016
EP 3285110 A1 2/2018

OTHER PUBLICATIONS

International Search Report and Written Opinion, received for PCT Application No. PCT/IB2024/059338, mailed on Mar. 3, 2025, 13 pages.

*Primary Examiner* — Sharrief I Broome

(57) ABSTRACT

Fitting methods for astigmatic contact lens sets that include apodized single vision lenses for lower cylinder error correction and toric lenses for higher cylinder error correction, and related astigmatic contact lens sets. An astigmatic eye with cylinder error greater than a higher designated cylinder error label power (e.g., >1.25 diopter (D)) can be fitted with a non-apodization toric lens that has a stabilization mechanism. However, an astigmatic eye with a cylinder error up to the higher designated cylinder error label power (e.g., <=1.25 diopter (D)) can be fitted with an apodized single-vision lens. The apodized single-vision lenses have an apodization profile that reduces aberrations to provide improved vision such that a larger number of astigmatic patients up to a higher cylinder error may find vision with an apodized single-vision lens acceptable, and with enhanced comfort that comes from not having a stabilization mechanism.

22 Claims, 14 Drawing Sheets

(58) Field of Classification Search
USPC .................................................... 351/159.74
See application file for complete search history.

(56) References Cited

U.S. PATENT DOCUMENTS

| | | | | |
|---|---|---|---|---|
| 5,905,561 | A * | 5/1999 | Lee .................. | B29D 11/00923 623/6.31 |
| 11,281,024 | B2 | 3/2022 | Jubin et al. | |
| 2014/0268021 | A1* | 9/2014 | Pugh ...................... | G02C 7/048 351/159.22 |
| 2020/0333631 | A1* | 10/2020 | Jubin ..................... | G02C 7/048 |

* cited by examiner

510

$$T(r) = \begin{cases} 1 \ (0 < r < 0.7897) \\ 1.2304 * \cos(0.7854 * r) \ (0.7897 \leq r \leq 2) \\ 0 \ (r > 2) \end{cases}$$

700

| | | | | |
|---|---|---|---|---|
| CYL ERROR (702): | 0.75D | 1.0D | 1.25D | 1.50D |
| TORIC LENS (704): | 0.1 | -0.1 | -0.4 | -0.6 |

FIG. 7A

706

| | | | | |
|---|---|---|---|---|
| CYL ERROR (702): | 0.75D | 1.0D | 1.25D | 1.50D |
| TORIC LENS (704): | 0.0 | -0.2 | -0.5 | -0.6 |

FIG. 7B

$$T(r) = \begin{cases} 1 \ (0 \le r \le 0.85) \\ 1.6 * \exp\left\{-\left(\frac{x}{1.166}\right)^2\right\} (0..85 < r \le 4) \\ 0 \ (r > 4) \end{cases}$$

FITTING METHODS FOR ASTIGMATIC CONTACT LENS SETS INCLUDING APODIZED SINGLE VISION LENSES FOR LOWER CYLINDER ERROR CORRECTION AND TORIC LENSES FOR HIGHER CYLINDER ERROR, AND RELATED ASTIGMATIC LENS SETS

PRIORITY APPLICATION

This application claims the benefit of U.S. Provisional Patent Application Ser. No. 63/540,159, filed on Sep. 25, 2023, entitled, "FITTING METHODS FOR ASTIGMATIC CONTACT LENS SETS INCLUDING APODIZED SINGLE-VISION LENSES FOR LOWER CYLINDER ERROR CORRECTION AND TORIC LENSES FOR HIGHER CYLINDER ERROR, AND RELATED ASTIGMATIC LENS SETS," the disclosure of which is hereby incorporated herein by reference in its entirety.

FIELD OF THE DISCLOSURE

The present disclosure relates to the field of ophthalmic lenses for use with astigmatic patients. More specifically, the present disclosure is directed to a system of lenses, including apodized lenses, and a method of prescribing the same for astigmatic patients.

BACKGROUND

Common conditions that lead to reduced visual acuity include myopia (i.e., nearsightedness) and hyperopia (i.e., farsightedness), for which corrective lenses in the form of spectacles or rigid or soft contact lenses are prescribed. These conditions are generally described as the imbalance between the length of the eye and the focus of the optical elements of the eye. Myopic eyes focus light in front of the retinal plane, and hyperopic eyes focus light behind the retinal plane. Myopia typically develops because the axial length of the eye grows to be longer than the focal length of the optical components of the eye; that is, the eye grows too long. Hyperopia typically develops because the axial length of the eye is too short compared with the focal length of the optical components of the eye. Patients with these conditions can have their vision corrected with spherical contact lenses having the appropriate lens spherical power.

Astigmatism is an optical or refractive defect in which an individual's vision is blurred due to the eye's inability to focus a point object into a focused image on the retina. Astigmatism is caused by a non-rotationally symmetric curvature of the refracting surfaces of the eye (including the cornea and crystalline lens). For example, FIG. 1A illustrates an astigmatic eye 100 that includes a cornea 102 that is curved more steeply in one direction than another such that the refracting surfaces of the cornea 102 are not rotationally symmetric. In other words, one or more of the refracting surfaces of the cornea 102 are more curved or steeper on the principal meridian relative to the other orthogonal principal meridian thereby having a different amount of optical power along the different meridians and a wavefront aberration. This causes an image 104 to be stretched out into two-line foci 106 rather than focused to a single point. A non-astigmatic eye 108 shown in FIG. 1B has a cornea 110 that has a rotationally symmetric refracting surface, thereby causing an image 112 to be focused to a single point 114.

Corneal astigmatism may be corrected using a hard or rigid gas-permeable contact lens. In this case, a fluid or tear lens may exist between the posterior surface of the rigid contact lens and the cornea. This fluid or tear lens follows or assumes the shape of the back surface of the contact lens. Since the index of refraction of the fluid or tear lens is nearly a match for the cornea, the corneal toricity is optically neutralized or reduced. In these cases, a toric lens will generally not be required. However, rigid gas-permeable contact lenses and hard contact lenses are generally less comfortable than soft or hydrogel contact lenses. Since soft or hydrogel contact lenses wrap around the cornea, a fluid lens is generally not found, and the tear fluid more closely resembles a thin film. In this case, a toric lens design is required.

A toric lens is an optical element having two different powers in two orientations that are perpendicular to one another. Essentially, a toric lens has two spherical powers along orthogonal meridians for correcting myopia or hyperopia. These powers are created with curvatures oriented at different angles, which are maintained relative to the eye. Toric lenses may be utilized in eyeglasses, intraocular lenses, and contact lenses. The toric lenses used in eyeglasses and intraocular lenses are held fixed relative to the eye by either the spectacle frame or haptics, thereby always providing optimal vision correction. Toric contact lenses, however, may tend to rotate on the eye, thereby temporarily providing sub-optimal vision correction. Accordingly, toric contact lenses also include a mechanism to keep the contact lens relatively stable on the eye when the wearer blinks or looks around.

Maintenance of the on-eye orientation of toric contact lenses is typically accomplished by mechanical means. For example, "prism stabilization," including decentering or tilting of the contact lens' front surface relative to the back surface, thickening of the inferior contact lens periphery, forming depressions or elevations on the contact lens surface, and truncating the contact lens edge are all methods that have been utilized.

Additionally, "static stabilization" has been used in which the contact lens is stabilized by the use of thick and thin zones or areas in which the thickness of the contact lens periphery is increased or reduced, as the case may be. Typically, the thick or thin zones are located in the contact lens periphery with symmetry about the vertical and/or horizontal axes. For example, each of two thick or thin zones may be positioned on either side of the optical zone and centered along the 0-180-degree axis of the contact lens, as shown, for example, in U.S. Pat. No. 11,281,024. In another example, a single thick zone positioned at the bottom of the contact lens provides a similar weight effect, like that of prism stabilization, but also incorporates a region of increasing thickness from top to bottom in order to utilize upper eyelid forces to stabilize the contact lens may be designed. It is important to note that the older technical literature utilized the term "dynamic stabilization" for what is meant here as static stabilization. The terms static and dynamic stabilization may be utilized interchangeably.

A challenge with currently designed or utilized stabilization zones is a tradeoff between contact lens stability and comfort, plus the physical limitations associated with increased thickness. The slope of the stabilization zones is fixed in the contact lens. Changes to the design to improve the rotational speed of settling, such as increasing the surface slope of the stabilization zone, also increases thickness and may adversely affect comfort. Additionally, a contact lens needs to accomplish two things, namely, to rotate to the proper orientation on insertion and to maintain that orientation through the wear period. Conventional designs require tradeoffs in performance between these things.

In astigmatic patients, it is known that the higher the amount of cylinder error correction that is required, the more sensitive the patient is to axis misalignments and rotational stability on the eye in terms of adversely affecting the wearer's visual acuity. See, e.g., U.S. Pat. No. 11,281,024. Therefore, a higher cylinder error correction requires a more robust stabilization mechanism in the lens design, which often requires more pronounced (thicker) stabilization zones. Such a stabilization mechanism, however, can cause increased awareness for patients, as the eyelids interact with the mechanical stability features of the lens. For lower cylinder error corrections, lens stabilization designs can be less pronounced, as patients are less sensitive to axial rotational misalignment, thereby allowing the patient to tolerate higher levels of misalignment before vision is adversely affected.

At present, some eye care practitioners attempt to fit low cylinder patients (typically cylinder powers <=0.75 diopter (D)) into spherical lenses rather than toric lenses by placing those patients in a "spherical equivalent" lens. The spherical equivalent lens is intended to give the closest estimate of the prescription without including a cylinder power for cylinder error correction. These patients are prescribed a spherical power lens, where the spherical power value is derived by taking their actual spherical power correction need and adding to it a number equal to half of their actual cylinder power need. Because these patients are not corrected appropriately for either their actual spherical power or cylinder power needs, they necessarily have degraded visual acuity with the spherical equivalent lens than they would with the best toric lens by a clinically significant degree (e.g., >0.5 line−10 log minimum angle of resolution (MAR)). However, a benefit to a wearer of spherical equivalent lenses as compared to toric lenses is that spherical lenses are typically less expensive and more comfortable than toric lenses.

In addition to myopia or hyperopic conditions described above, human visual systems often have higher-order aberrations that prevent precise focus on an image point, resulting in blurry images and decreased retinal image quality. These higher-order aberrations can include spherical aberration, coma, trefoil, etc. Spherical aberration (SPHA) occurs when the focal point location changes with increased radius from the lens center, leading to reduced image contrast and resulting in reduced visual acuity. For example, FIG. 2 is a graph 200 that shows an example of an averaged ocular spherical aberration (SPHA) ($D/mm^2$) in curve 202 for a patient's eye as a function of diopters (SKU (D)) in comparison with typical spherical lens SPHA in curve 204. As shown in the graph 200 in FIG. 2, at −3 D, the average ocular SPHA of a patient's eye in curve 202 cancels with the lens SPHA in curve 204. However, due to a large amount of ocular SPHA deviation, most patients have residual SPHA in an ocular lens system. Besides SPHA and astigmatism, other aberrations, including HOAs and slight defocus aberration (less than 0.25 D, for example), could also contribute to a patient's retinal image quality degradation. With all these residual aberrations (including astigmatism, SPHA, slight defocus, HOAs, etc.), it has a lower root mean square (RMS) in its center area than its peripheral regions. Thus, overall wavefront RMS will be reduced by masking the peripheral region.

Spherical aberration can be more pronounced in the toric meridian in uncorrected astigmats (e.g., when astigmats wear spherical equivalent lenses) than myopes or hyperopes due to the difference in curvature of the two different meridians. Residual aberrations (including astigmatism, spherical aberrations, defocus, etc.) have a wavefront with lower RMS in the central region than in the periphery.

Overall, wavefront RMS for a contact lens wearer having these aberrations can be reduced by "masking" peripheral regions of a lens, which is also referred to as "apodization." "Masking" or "apodizing" refers to the manipulation of the percentage of light transmittance through the lens relative to its radial position from the central axis. The apodization profile of a lens can take on different forms depending on design intent, such as a Gaussian or non-Gaussian profile, with or without a central region of 100% transmittance, and a profile that extends to the edge of the optical zone or to the lens edge.

Benefits to apodization can include an increase in Modular Transfer Function (MTF) for lower spatial frequencies of interest. The gradual variation of the apodization transmission profile can reduce the impact of diffraction at the edge of the pupil, and/or reduce the impact of higher-order aberrations, all of which can lead to improved overall visual performance.

SUMMARY OF THE DISCLOSURE

Aspects disclosed herein include fitting methods for astigmatic contact lens sets that include apodized single-vision lenses for lower cylinder error correction and a toric lens for higher cylinder error correction. Related astigmatic contact lens sets are disclosed. In exemplary aspects, an astigmatic contact lens set is provided that includes a first subset (i.e., one or more) of lenses that are apodized single-vision lenses available in different prescriptions having a spherical power for refractive error correction and an apodization profile. The contact lens set also includes a second subset (i.e., one or more) of lenses available that are non-apodization toric lenses available in different prescriptions having a spherical power for refractive error correction and cylinder power for cylinder error correction. An astigmatic patient can be fitted for lenses from the single-vision and toric lenses in the respective first and second subsets of lenses in the contact lens set, depending on their refractive error correction and cylinder error correction prescription.

In exemplary aspects, apodized single-vision lenses from the first subset of lenses in the contact lens set are provided for use in an astigmatic eye(s) of a patient that has a lower cylinder error less than the designated cylinder error label power for the contact lens set (e.g., <=1.25 diopter (D)). The non-apodization toric lenses from the second subset of lenses of the contact lens set are provided for use in an astigmatic eye(s) of a patient with a higher cylinder error greater than the designated cylinder error label power for the contact lens set (e.g., >1.25 diopter (D)). The apodized single-vision lenses in the contact lens set, being apodized lenses that include an apodization profile, reduce or mask transmitted light through peripheral regions of the spherical lens to reduce the effective pupil size of a patient. This reduces aberrations in the overall wavefront for the lens wearer fitted with such apodized single-vision lenses and has the effect of improving vision in the astigmatic patient with either a minimal or no tradeoff in visual acuity (VA) for astigmatic patients with cylinder error that is at or below the designated cylinder error label power. For example, a contact lens set has been developed as disclosed herein that includes apodized single-vision lenses to correct vision for an astigmatic eye having a cylinder error correction all the way up to 1.25 diopter (D) as the designated cylinder error label power with a minimal or no tradeoff in VA. Thus, a larger number of patients with astigmatic eyes up to a higher cylinder error to the designated cylinder error label power may be able to be fitted with an apodized single-vision lens from the contact lens set that provides VA acceptable to the astigmatic patient and with enhanced comfort. This can avoid or reduce the need for astigmatic patients with cylinder error, up to the designated cylinder label power to be fitted with toric lenses, which may be less desirable due to less comfort (e.g., such as due to its stabilization mechanism) and/or being more expensive.

Thus, in the disclosed contact lens set, if an astigmatic patient has an astigmatic eye with a cylinder error correction less than the designated cylinder error (e.g., <=1.25 D), the astigmatic eye can be fitted with the apodized single-vision lens from the first subset of lenses that may be more comfortable for wear and provide vision with a minimal or no tradeoff in VA. This allows a larger number of patients with astigmatic eyes, up to a higher cylinder error to the designated cylinder error label power, to be able to be fitted with an apodized single-vision lens from the contact lens set that may provide an acceptable VA to the patient and with enhanced comfort. However, if an astigmatic patient with an astigmatic eye prefers a toric lens and/or has a cylinder error correction greater than the designated cylinder error label power (e.g., >1.25 D) for the contact lens set, the astigmatic eye can be fitted with a toric lens from the second subset of lenses that has a refractive error correction label power and cylinder error label power corresponding to correction need of the astigmatic eye.

In one exemplary aspect, if it is determined that the astigmatic eye has a cylinder error correction less than the designated cylinder error label power such that the astigmatic eye is fitted with an apodized single-vision lens, the astigmatic eye can be fitted with the apodized single-vision lens as a spherical equivalent lens. The spherical equivalent lens is a single-vision lens that has a spherical power that is based on both the refractive error correction and the cylinder error correction of the astigmatic eye. For example, a spherical equivalent lens may have a spherical power that is based on averaging the summation of the refractive error correction and the cylinder error correction. The spherical equivalent lens is intended to give the closest estimate of the astigmatic eye prescription without including a cylinder power for cylinder error correction.

In another exemplary aspect, if it is determined that the astigmatic eye has a cylinder error correction less than the designated cylinder error label power such that the astigmatic eye is fitted with an apodized single-vision lens, the astigmatic eye can be fitted with the apodized single-vision lens that has a refractive error correction label power corresponding the actual refractive error correction of the astigmatic eye. An apodized single-vision lens that has an apodization profile may reduce aberrations in the overall wavefront of a lens wearer, such that a single-vision lens having a refractive error correction label power corresponding to the refractive error correction of the astigmatic eye can be fitted to the astigmatic eye and still provide a sufficient refractive error correction to achieve acceptable or improved vision.

In another exemplary aspect, a method of fitting a contact lens of a contact lens set for astigmatic patients comprising a plurality of lenses, each having a spherical power to substantially correct refractive error corresponding to a unique refractive error label power, is provided. The method comprises determining a refractive error correction and a cylinder error correction for an astigmatic eye of a contact lens wearer based on a refractive error and a cylinder error in the astigmatic eye. In response to determining the cylinder error correction of the astigmatic eye <=1.25D, the method comprises selecting a first lens from a first subset of lenses to be fitted to the astigmatic eye having a refractive error label power related to the determined refractive error correction. In response to determining the cylinder error correction of the astigmatic eye >1.25D, the method comprises selecting a second lens from a second subset of lenses to be fitted to the astigmatic eye having a refractive error label power corresponding to the determined refractive error correction and having a cylinder error label power corresponding to the determined cylinder error correction. The first subset of lenses of the plurality of lenses each comprises a single vision lens further having an apodization profile. The second subset of lenses of the plurality of lenses each comprises a non-apodized toric lens further having a cylinder power to substantially correct cylinder error corresponding to a unique cylinder error label power >1.25 diopter (D).

In another exemplary aspect, a contact lens set for correcting vision in an astigmatic eye of a contact lens wearer is provided. The contact lens set comprises a plurality of lenses each having a spherical power to substantially correct refractive error corresponding to a unique refractive error label power. A first subset of lenses of the plurality of lenses each has a first optical zone having a first center axis and a first radius extending from the first center axis to a first lens edge, and each comprising a single vision lens further having an apodization profile. A second subset of lenses of the plurality of lenses each comprises a non-apodized toric lens further having a cylinder power to substantially correct cylinder error corresponding to a unique cylinder error label power >1.25 diopter (D). The apodization profile in each lens of the first subset of lenses comprises a first transmission zone that allows 100% transmission from the first center axis to the first radius of about 0.7897 millimeters (mm) and a second transmission zone that has a transmission less than 100% and wherein such transmission decreases as a function of increase in the first radius.

Additional features and advantages will be set forth in the detailed description that follows and, in part, will be readily apparent to those skilled in the art from the description or recognized by practicing the aspects as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding and are incorporated in and constitute a part of this specification. The drawings illustrate one or more aspects and, together with the description, serve to explain the principles and operation of the various aspects.

BRIEF DESCRIPTION OF THE FIGURES

The foregoing and other features and advantages of the disclosure will be apparent from the following, more particular descriptions of the aspects of the disclosure, as illustrated in the accompanying drawings.

FIG. 7A is a table illustrating exemplary differences in differences in VA for an astigmatic eye with a prescribed refractive error and cylinder error when wearing: (1) an apodized single-vision lens having an apodization profile (e.g., like the apodized single-vision lens in FIG. 4) with a spherical power corresponding to the spherical equivalent power for the prescribed refractive error; as compared to when wearing (2) a toric lens without apodization with a spherical power and cylinder power corresponding to the prescribed refractive error and cylinder error;

FIG. 7B is a table illustrating exemplary differences in differences in VA for an astigmatic eye with a prescribed refractive error and cylinder error when wearing: (1) an apodized single-vision lens having an apodization profile (e.g., like the apodized single-vision lens in FIG. 4) with a spherical power corresponding to the spherical power for the prescribed refractive error; as compared to when wearing (2) a toric lens without apodization with a spherical power and cylinder power corresponding to the prescribed refractive error and cylinder error.

DETAILED DESCRIPTION

Aspects disclosed herein include fitting methods for astigmatic contact lens sets that include apodized single-vision lenses for lower cylinder error correction and a toric lens for higher cylinder error correction. Related astigmatic contact lens sets are disclosed. In exemplary aspects, an astigmatic contact lens set is provided that includes a first subset (i.e., one or more) of lenses that are apodized single-vision lenses available in different prescriptions having a spherical power for refractive error correction and an apodization profile. The contact lens set also includes a second subset (i.e., one or more) of lenses available that are non-apodization toric lenses available in different prescriptions having a spherical power for refractive error correction and cylinder power for cylinder error correction. An astigmatic patient can be fitted for lenses from the single-vision and toric lenses in the respective first and second subsets of lenses in the contact lens set, depending on their refractive error correction and cylinder error correction prescription.

Figure 1A:
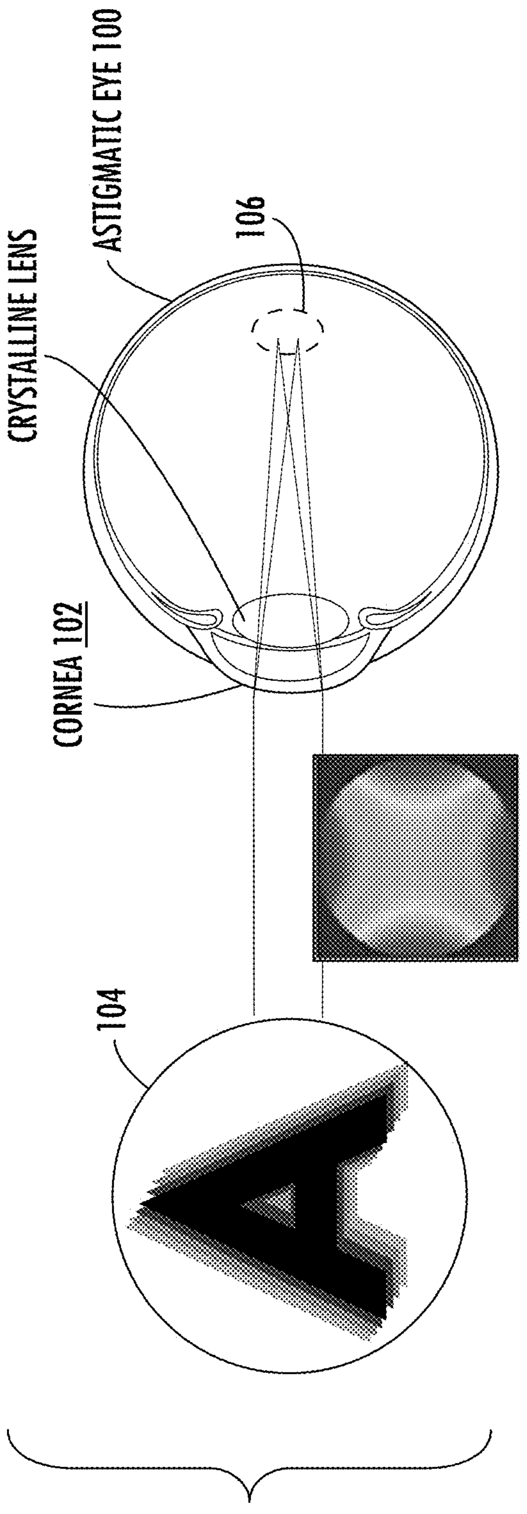
FIGS. 1A and 1B are schematic diagrams of an astigmatic eye and normal eye, respectively.
Figure 1B:
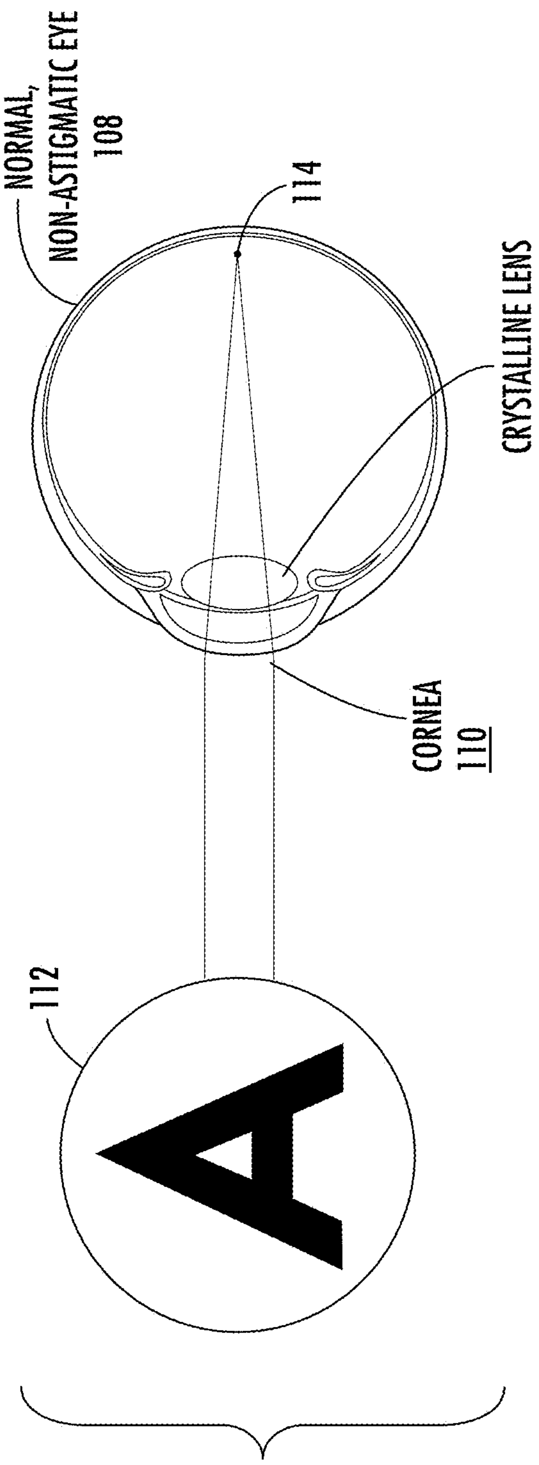
Figure 2:
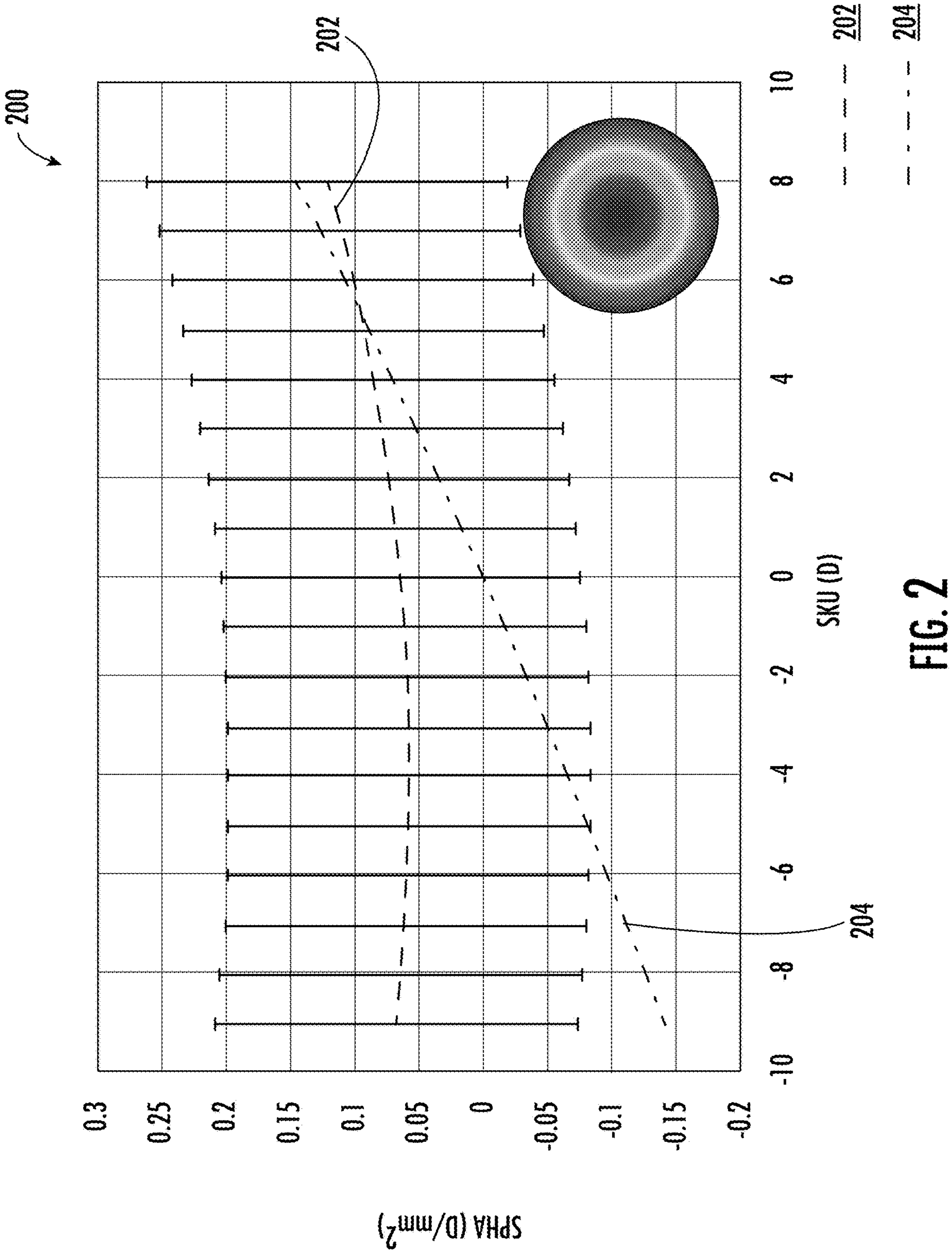
FIG. 2 is a graph illustrating an exemplary ocular spherical aberration (SPHA) of an average eye as compared to a conventional SPHA of a spherical lens as a function of diopter (D)
Figure 3:
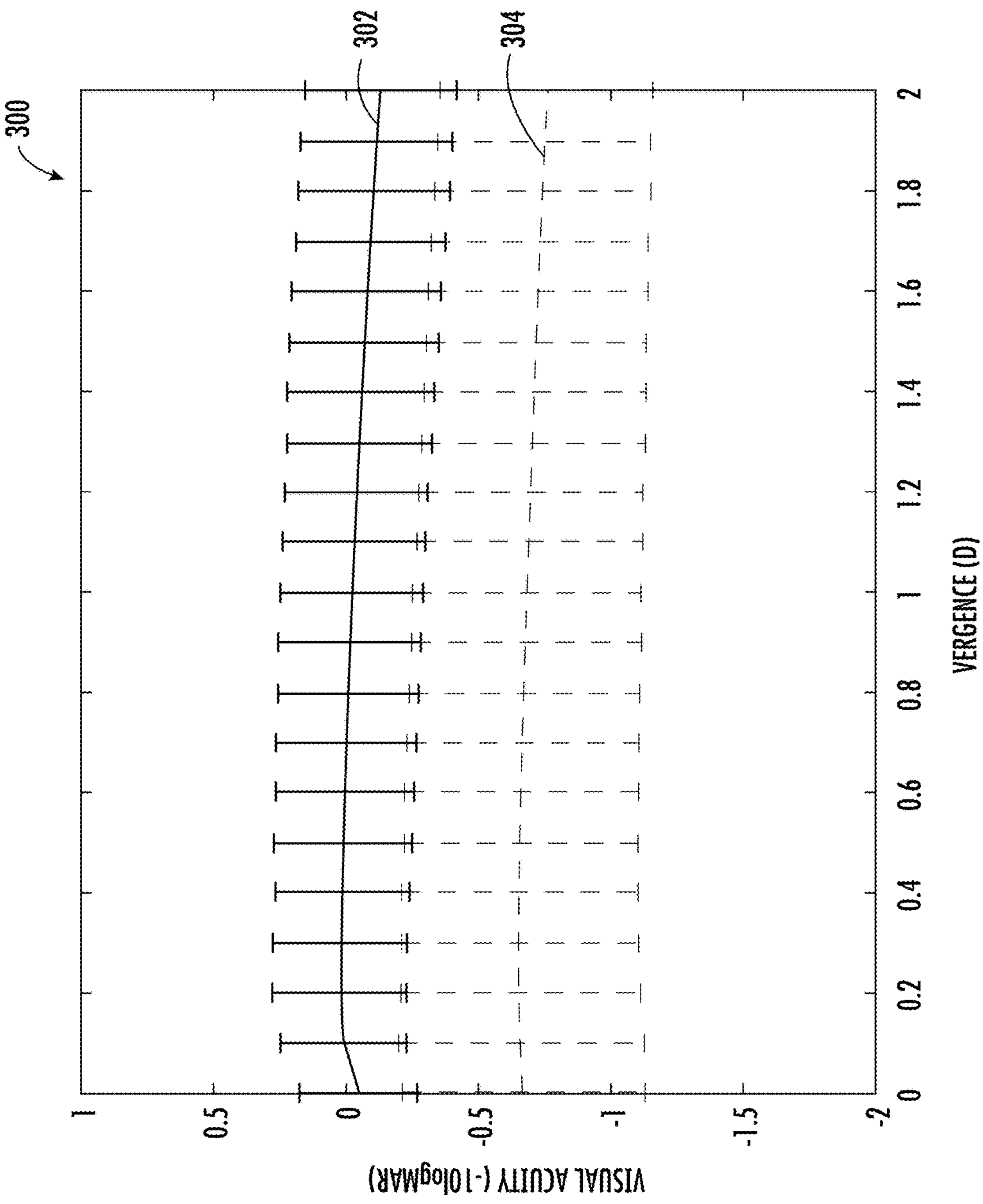
FIG. 3 is a graph illustrating an exemplary simulation of visual acuities (VAs) of an astigmatic eye wearing a toric lens and wearing a spherical equivalent lens as a function of vergence.

FIG. 3 is a graph 300 illustrating an exemplary simulation of visual acuities (VAs) (in unit of −10 log minimum angle of resolution (MAR)) of an astigmatic eye wearing a toric lens and wearing a spherical equivalent lens as a function of vergence. VA performance curve 302 in FIG. 3 is an averaged through-focus VA of ten (10) astigmatic patients with a refractive error correction of −3 D and a cylinder error correction of 0.75 D. VA performance curve 304 in FIG. 3 is the VA performance of the same group of patients fitted with a spherical equivalent contact lens. A spherical equivalent as a spherical power value is derived by taking the patient's actual refractive power correction need and adding to it a number equal to a proportion (e.g., half) of their actual cylinder power need. As shown in FIG. 3, the VA performance curve 304 for toric patients fitted with a spherical equivalent lens is lower than the VA performance curve 302 for toric patients fitted with a toric lens. This is because patients fitted with a spherical equivalent lens are not corrected appropriately for either their actual spherical power or cylinder power needs. Toric patients fitted with a spherical equivalent lens necessarily may have degraded VA with the spherical equivalent lens than they would with a toric lens by a clinically significant degree (e.g., >0.5 line−10 log MAR). However, a benefit to a wearer of spherical equivalent lenses as compared to toric lenses is that spherical lenses are typically less expensive and more comfortable than toric lenses. The stabilization mechanism incorporated in the peripheral lens region of a toric lens to maintain the lens with the correct orientation can reduce contact lens comfort.

In this regard, in exemplary aspects, aspects disclosed herein include apodized single-vision lenses from the first subset of lenses in the contact lens set are provided for use in an astigmatic eye(s) of a patient that has a lower cylinder error less than designated cylinder error label power for the contact lens set (e.g., <=1.25 diopter (D)). The non-apodization toric lenses from the second subset of lenses of the contact lens set are provided for use in an astigmatic eye(s) of a patient with a higher cylinder error greater than the designated cylinder error label power for the contact lens set (e.g., >1.25 diopter (D)). The apodized single-vision lenses in the contact lens set, being apodized lenses that include an apodization profile, reduce or mask transmitted light through peripheral regions of the spherical lens to reduce the effective pupil size of the patient. This reduces aberrations in the overall wavefront for the lens wearer fitted with such apodized single-vision lenses and has the effect of improving vision in the astigmatic patient with either a minimal or no tradeoff in VA for astigmatic patients with cylinder error that is at or below the designated cylinder error label power. For example, a contact lens set has been developed as disclosed herein that includes apodized single-vision lenses to correct vision for an astigmatic eye having a cylinder error correction all the way up to 1.25 diopter (D) as the designated cylinder error label power with a minimal or no tradeoff in VA. Thus, a larger number of patients with astigmatic eyes up to a higher cylinder error to the designated cylinder error label power may be able to be fitted with a single-vision lens from the contact lens set that provides a VA acceptable to the astigmatic patient, and with enhanced comfort. This can avoid or reduce the need for astigmatic patients with cylinder error up to the designated cylinder label power to be fitted with toric lenses, which may be less desirable, such as due to less comfort (e.g., such as due to its stabilization mechanism) and/or being more expensive.

Thus, in the disclosed contact lens sets discussed herein, if an astigmatic patient has an astigmatic eye with a cylinder error correction less than the designated cylinder error (e.g., <=1.25 D), the astigmatic eye can be fitted with the apodized single vision lens from the first subset of lenses that may be more comfortable for wear and provide vision with a minimal or no tradeoff in VA. This allows a larger number of patients with astigmatic eyes up to a higher cylinder error to the designated cylinder error label power to be able to be fitted with a single-vision lens from the contact lens set that may provide an acceptable VA to the patient and with enhanced comfort. However, if an astigmatic patient with an astigmatic eye prefers a toric lens and/or has a cylinder error correction greater than the designated cylinder error label power (e.g., >1.25 D) for the contact lens set, the astigmatic eye can be fitted with a toric lens from the second subset of lenses that has a refractive error correction label power and cylinder error label power corresponding to correction need of the astigmatic eye.

Figure 4:
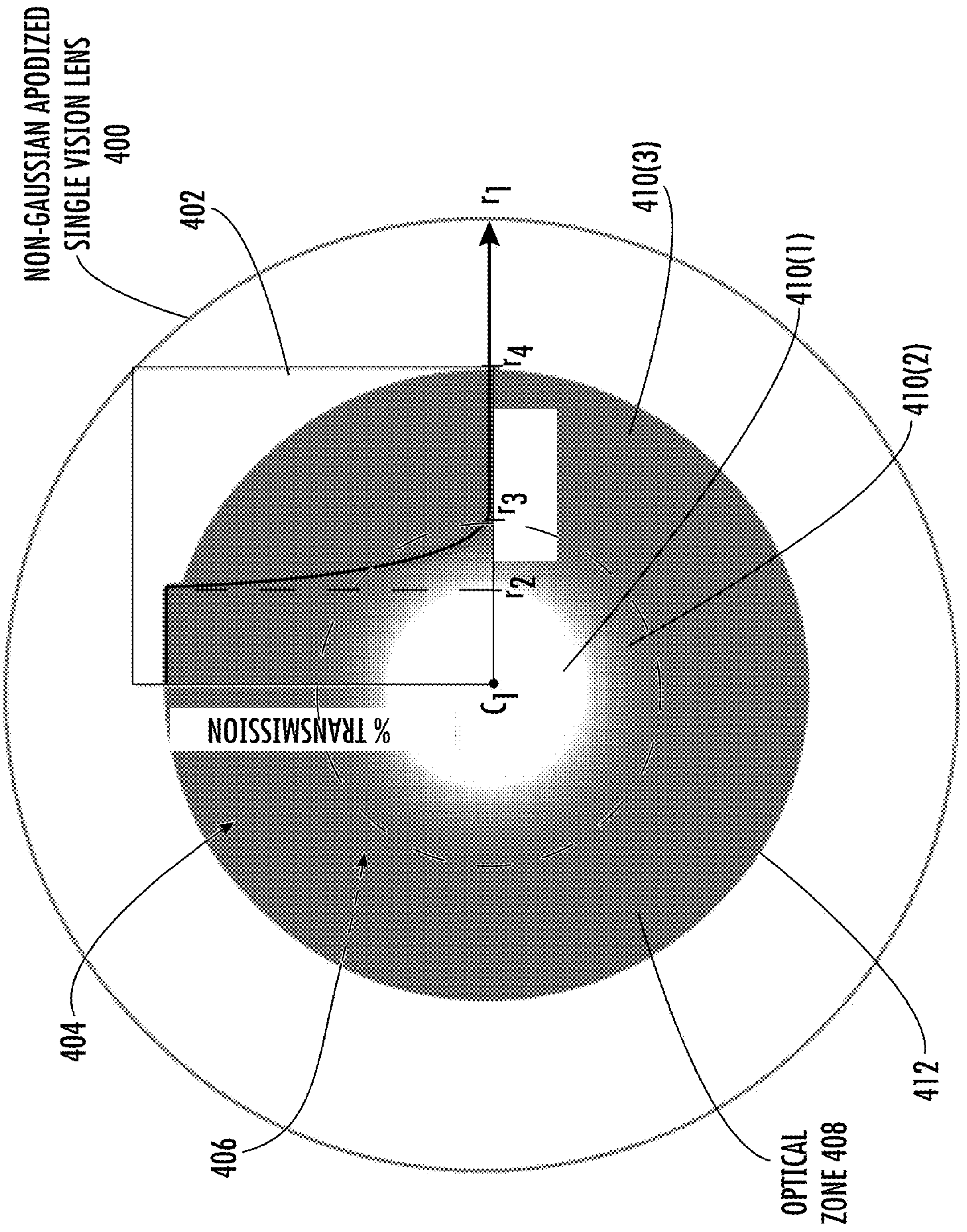
FIG. 4 is a diagram of an exemplary apodized single-vision lens that includes an exemplary non-Gaussian apodization transmission profile that filters light transmission relative to the radius of the apodized single-vision lens and that can be used as a spherical lens or spherical equivalent lens for an astigmatic eye to provide refractive error correction.

In this regard, FIG. 4 is a diagram of an exemplary apodized single-vision lens 400 that has a refractive error correction and includes an exemplary apodization profile 402 which is a non-Gaussian apodization transmission profile. The non-Gaussian apodized single-vision lens 400 is an example of an apodized single-vision lens that can provided for use in an astigmatic eye(s) of a patient that has a lower cylinder error less than designated cylinder error label power for the contact lens set (e.g., <=1.25 diopter (D)). The non-Gaussian apodized single-vision lens 400 can be used as a spherical lens or spherical equivalent lens for an astigmatic eye to provide refractive error correction. Either a front surface 404 or a back surface 406 of an optical zone 408 of the non-Gaussian apodized single-vision lens 400 can have a spherical power to provide for refractive error correction according to the spherical power profile provided in the non-Gaussian apodized single-vision lens 400.

As shown in FIG. 4, the apodization profile 402 in the non-Gaussian apodized single-vision lens 400 filters light transmission through an optical zone 408 of the non-Gaussian apodized single-vision lens 400 relative to the radius r of the non-Gaussian apodized single-vision lens 400 from its center axis $C_1$. In this example, the non-Gaussian apodization transmission profile 402 includes a first transmission zone 410(1) in the optical zone 408 between the center axis $C_1$ and a second radius $r_2$ of the optical zone 408 that is constant with a flat top to provide a constant 100% (or approximately 100%) of transmission of light through the optical zone 408. For example, the first radius $r_1$ may be approximately 0.7897 millimeters (mm). The non-Gaussian apodization transmission profile 402 also provides a second transmission zone 410(2) in the optical zone 408 between the second radius $r_2$ and a third radius $r_3$ of the optical zone 408 that has a curved profile to reduce the transmission of light of the non-Gaussian apodized single-vision lens 400 decreasingly as a function of increased radius towards an edge 412 of the optical zone 408. The non-Gaussian apodization transmission profile 402 also provides a third transmission zone 410(3) in the optical zone 408 between the third radius $r_3$ and a fourth radius $r_4$ (at the edge 412) of the optical zone 408 that has a curved profile to increasingly reduce the transmission of light through the optical zone 408 to a fourth radius $r_4$ of the non-Gaussian apodized single-vision lens 400.

Figures 5A, 5B:
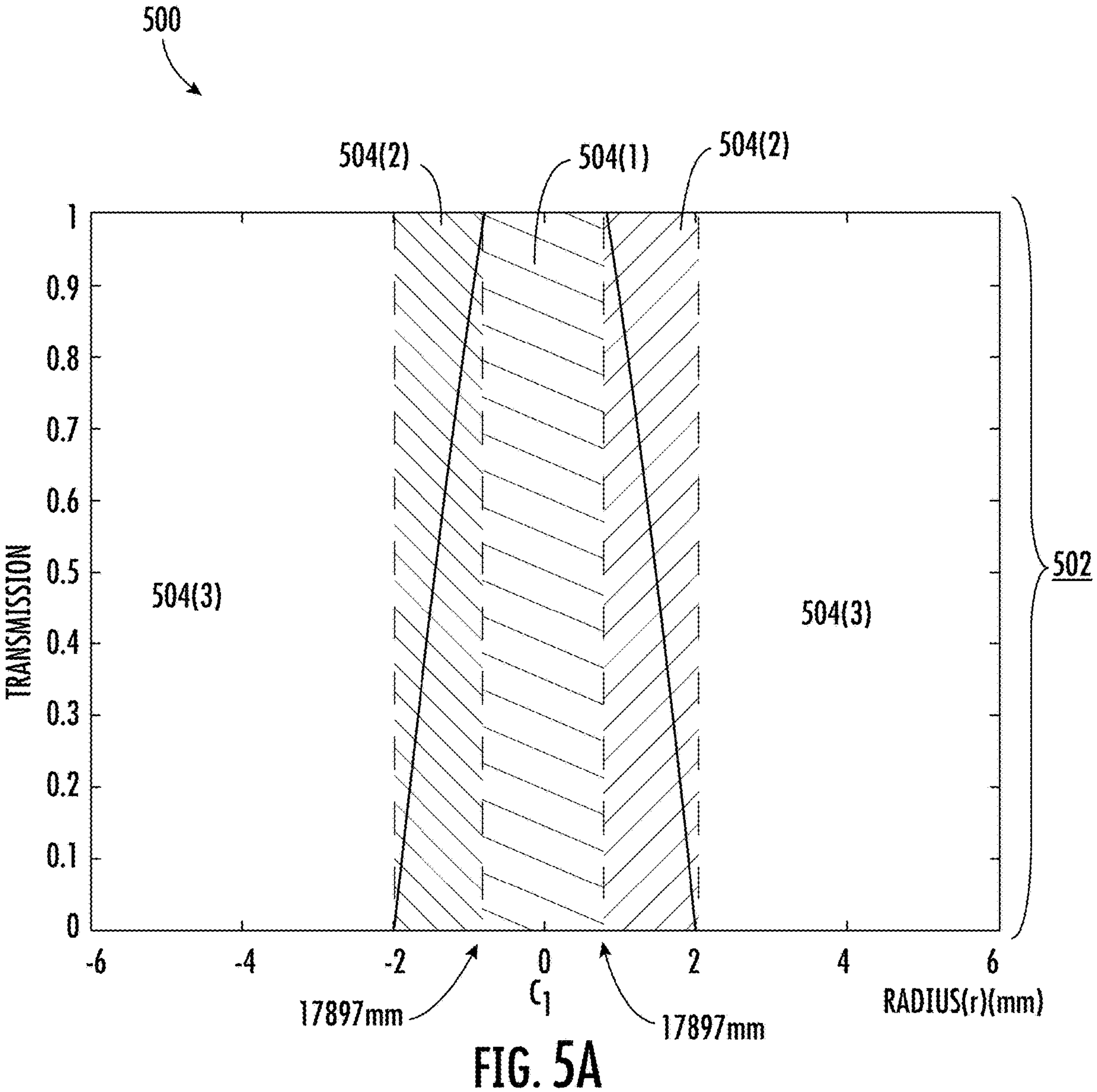
FIG. 5A is a graph of an exemplary non-Gaussian apodization transmission profile that can be provided in the apodized single-vision lens in FIG. 4.
FIG. 5B is a formula of the non-Gaussian apodization transmission profile in FIG. 5A as a function of the radius of the apodized single-vision lens.

FIG. 5A is a transmission graph 500 of the exemplary non-Gaussian apodization transmission profile 502 that can be provided as the apodization profile 402 in the non-Gaussian apodized single-vision lens 400 in FIG. 4. As shown in FIG. 5A, the transmission graph 500 plots the percentage of light transmission as a function of radius r from a center axis $C_1$. The non-Gaussian apodization transmission profile 502 includes a first transmission region 504(1) from the center axis $C_1$ to a radius of 0.7897 mm, where 100% of light is transmitted. The non-Gaussian apodization transmission profile 502 also includes a second transmission region 504(2) from the center axis $C_1$ to a radius of 2.0 mm, where the percentage of light transmitted decreases as a function of radius to 2.0 mm. The non-Gaussian apodization transmission profile 502 also includes a third transmission region 504(2) from the center axis $C_1$ beyond a radius of 2.0 mm where the percentage of light transmitted is 0%. FIG. 5B is a formula 510 for light transmission (T) as a function of radius (r) (T/r) for the exemplary non-Gaussian transmission apodization profile 502 in FIG. 5A.

The non-apodization toric lenses from the second subset of lenses of the contact lens set are provided for use in an astigmatic eye(s) of a patient with a higher cylinder error greater than the designated cylinder error label power for the contact lens set (e.g., >1.25 diopter (D)). The second subset of lenses can include one lens or more than one lens for use in an astigmatic eye(s) of a patient with a higher cylinder error greater than the designated cylinder error label power for the contact lens set. The apodized single-vision lenses in the contact lens set, being apodized lenses that include an apodization profile, reduce or mask transmitted light through peripheral regions of the spherical lens to reduce the effective pupil size of the patient. This reduces aberrations in the overall wavefront for the lens wearer fitted with such apodized single-vision lenses and has the effect of improve vision in the astigmatic patient with either a minimal or no tradeoff in VA for astigmatic patients with cylinder error that is at or below the designated cylinder error label power. For example, a contact lens set has been developed as disclosed herein that includes apodized single-vision lenses to correct vision for an astigmatic eye having a cylinder error correction all the way up to 1.25 diopter (D) as the designated cylinder error label power with a minimal or no tradeoff in VA. Thus, a larger number of patients with astigmatic eyes up to a higher cylinder error to the designated cylinder error label power may be able to be fitted with a single-vision lens from the contact lens set that provides a VA acceptable to the astigmatic patient, and with enhanced comfort. This can avoid or reduce the need for astigmatic patients with cylinder error up to the designated cylinder label power to be fitted with toric lenses, which may be less desirable, such as due to less comfort (e.g., such as due to its stabilization mechanism) and/or being more expensive.

FIGS. 6A-6D are graphs 600A-600D, respectively, illustrating exemplary VA (−10 log MAR) of a similar single-vision lens without apodization (VA_Base), a non-Gaussian apodized single-vision lens (e.g., like the non-Gaussian apodized single-vision lens 400 in FIG. 4) (VA_Apod), and an exemplary non-apodization toric lens (VA_Max) as function of vergence (D) for patient wearers with various cylinder error and cylinder power (in the toric lens).

Figure 6A:
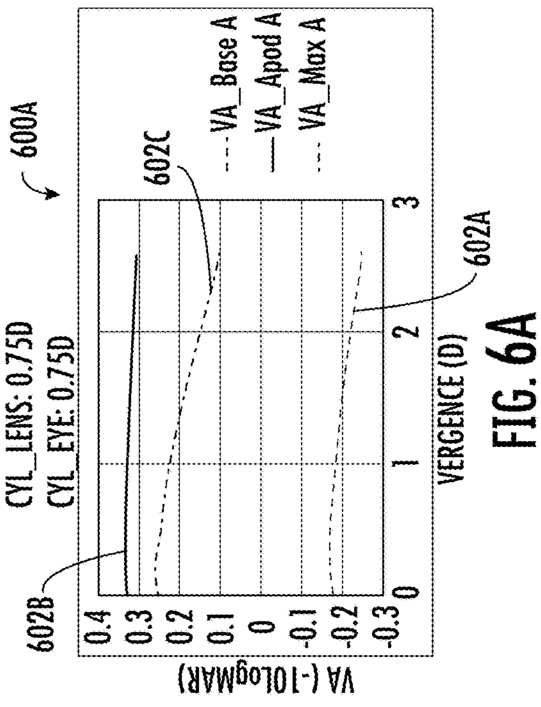
FIGS. 6A-6D are graphs illustrating exemplary VAs of a similar single-vision lens without apodization, the apodized single-vision lens in FIG. 4, and an exemplary non-apodization toric lens, all as a function of vergence.

FIG. 6A shows a graph 600A of VA curve 602A for a patient wearer that has a cylinder error of 1.0 D fitted with a single-vision lens without apodization (VA_BaseA), a VA curve 602B for the patient wearer fitted with a non-Gaussian apodized single-vision lens (e.g., like the non-Gaussian apodized single-vision lens 400 in FIG. 4) (VA_ApodA), and VA curve 602C for the patient wearer fitted with a non-apodization toric lens with a cylinder power of 0.75 D (VA_MaxA), all as a function of vergence (D). As shown in FIG. 6A, there is more than a 0.5 line of VA improvement in the non-apodization toric lens with a cylinder power of 0.75 D (VA_MaxA) over the single-vision lens without apodization (VA_BaseA). Thus, VA can be improved by fitting the patient with the non-apodization toric lens with a cylinder power of 0.75 D (VA_maxA). However, as also shown in FIG. 6A, there is yet an additional VA improvement in the non-Gaussian apodized single-vision lens (e.g., like the non-Gaussian apodized single-vision lens 400 in FIG. 4) (VA_ApodA) over the non-apodization toric lens with a cylinder power of 0.75 D (VA_maxA). Thus, by fitting a patient having 0.75 D cylinder error with spherical equivalent apodized single-vision lens (VA_ApodA) (e.g., like the non-Gaussian apodized single-vision lens 400 in FIG. 4), the patient may not only enjoy an improved VA but also an increased comfort over the non-apodization toric lens with a cylinder power of 0.75 D with a stabilization mechanism. (VA_max).

As previously discussed, an apodized single-vision lens that includes an apodization profile can reduce or mask transmitted light through peripheral regions of the optical zone to reduce the effective pupil size of a patient. This reduces aberrations in the overall wavefront for the lens wearer fitted such apodized single-vision lenses and has the effect of improving vision in the astigmatic patient with either a minimal or no tradeoff in VA for astigmatic patients with the 0.75 D cylinder error.

Figure 6B:
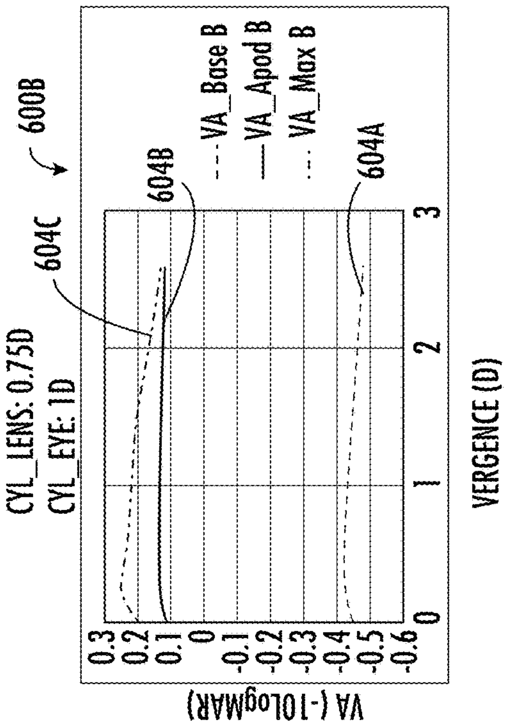

FIG. 6B shows a graph 600B of VA curve 604A for a patient wearer who has a cylinder error of 1.0 D fitted with a single-vision lens without apodization (VA_BaseB), a VA curve 604B for the patient wearer fitted with a non-Gaussian apodized single-vision lens 400 (e.g., like the non-Gaussian apodized single-vision lens 400 in FIG. 4) (VA_ApodB), and VA curve 604C for the patient wearer fitted with a non-apodization toric lens with a cylinder power of 0.75 D (VA_maxB), all as a function of vergence (D). As shown in FIG. 6B, there is more than a 0.5 line of VA improvement in the non-apodization toric lens with a cylinder power of 0.75 D (VA_maxB) over the single-vision lens without apodization (VA_BaseB). Thus, VA can be improved by fitting the patient with the non-apodization toric lens with a cylinder power of 0.75 D (VA_maxB). However, as also shown in FIG. 6B, while there is not a VA improvement in the non-Gaussian apodized single-vision lens (e.g., like the non-Gaussian apodized single-vision lens 400 in FIG. 4) (VA_ApodB) over the non-apodization toric lens with a cylinder power of 0.75 D (VA_maxB), the difference in VA between these lenses is less than 0.5 line VA. Thus, by fitting a patient having 0.75 D cylinder error with the non-Gaussian apodized single-vision lens (VA_ApodB) (e.g., like the non-Gaussian apodized single-vision lens 400 in FIG. 4), the patient may enjoy an increased comfort over the non-apodization toric lens with a cylinder power of 0.75 D with a stabilization mechanism (VA_maxB), with very little or minimal tradeoff in VA.

Figure 6C:
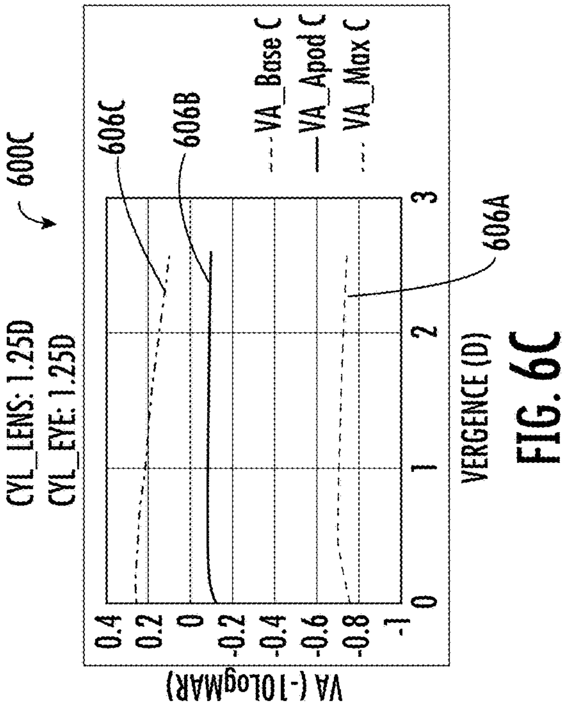

FIG. 6C shows a graph 600C of VA curve 606A for a patient wearer that has a cylinder error of 1.25 D fitted with a single-vision lens without apodization (VA_BaseC), a VA curve 606B for the patient wearer fitted with a non-Gaussian apodized single-vision lens (e.g., like the non-Gaussian apodized single-vision lens 400 in FIG. 4) (VA_ApodC), and VA curve 606C for the patient wearer fitted with a non-apodization toric lens with a cylinder power of 1.25 D (VA_maxC), all as a function of vergence (D). As shown in FIG. 6C, there is more than a 0.8 line of VA improvement in the non-apodization toric lens with a cylinder power of 1.25 D (VA_maxC) over the single-vision lens without apodization (VA_BaseC). Thus, VA can be improved by fitting the patient with the non-apodization toric lens with a cylinder power of 1.25 D (VA_maxC). However, as also shown in FIG. 6C, while there is not a VA improvement in the non-Gaussian apodized single-vision lens (e.g., like the non-Gaussian apodized single-vision lens 400 in FIG. 4) (VA_ApodC) over the non-apodization toric lens with a cylinder power of 1.25 D (VA_maxC), the difference in VA between these lenses is less than 0.5 line VA. Thus, by fitting a patient having 1.25 D cylinder error with a non-Gaussian apodized single-vision lens (VA_ApodC) (e.g., like the non-Gaussian apodized single-vision lens 400 in FIG. 4), the patient may enjoy an increased comfort over the non-apodization toric lens with a cylinder power of 1.25 D with a stabilization mechanism (VA_maxC), with very little or minimal tradeoff in VA. Also, fitting a patient having 1.25 D cylinder error with the non-Gaussian apodized single-vision lens (VA_ApodC) (e.g., like the non-Gaussian apodized single-vision lens 400 in FIG. 4), can result in at least a 0.5 line VA improvement over the single-vision lens without apodization (VA_BaseC).

Figure 6D:
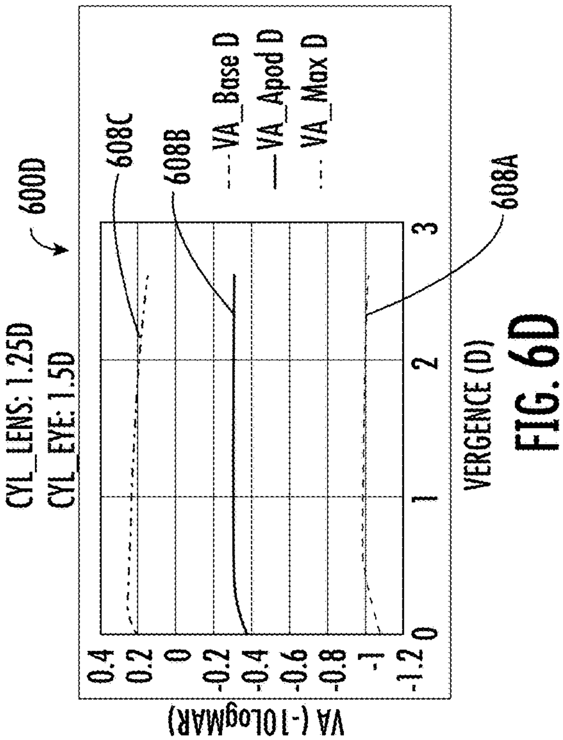

FIG. 6D shows a graph 600D of VA curve 608A for a patient wearer who has a cylinder error of 1.5 D fitted with a single-vision lens without apodization (VA_BaseC), a VA curve 608B for the patient wearer fitted with a non-Gaussian apodized single-vision lens 400 (e.g., like the non-Gaussian apodized single-vision lens 400 in FIG. 4) (VA_ApodD), and VA curve 608C for the patient wearer fitted with a non-apodization toric lens with a cylinder power of 1.25 D (VA_maxD), all as a function of vergence (D). As shown in FIG. 6D, there is more than a 0.5 line of VA improvement in the non-apodization toric lens with a cylinder power of 1.25 D (VA_maxD) over the single vision lens without apodization (VA_BaseD). Thus, VA can be improved by fitting the patient with the non-apodization toric lens with a cylinder power of 1.25 D (VA_maxD). However, as also shown in FIG. 6D, while there is not a VA improvement in a non-Gaussian apodized single-vision lens (e.g., like the non-Gaussian apodized single-vision lens 400 in FIG. 4) (VA_ApodD) over the non-apodization toric lens with a cylinder power of 1.25 D (VA_maxD), the difference in VA between these lenses is less than about 0.6 line VA. Thus, by fitting a patient having 1.5 D cylinder error with a non-Gaussian apodized single-vision lens (VA_ApodD) (e.g., like the non-Gaussian apodized single-vision lens 400 in FIG. 4), the patient may enjoy an increased comfort over the non-apodization toric lens with a cylinder power of 1.25 D with a stabilization mechanism (VA_maxC), with very little (e.g., more than 0.5 line) tradeoff in VA. A VA that is decreased by more than 0.5 line may not be an acceptable design performance, and thus in this example, it may be desired to fit a toric patient with the non-Gaussian apodized single-vision lens up to 1.25 D cylinder error as the cylinder error label power. However, that may still be an improvement over a non-apodized single-vision lens that may only be able to be used to fit a patient with a reduced cylinder error (e.g., up to only 0.75 D cylinder error) and thereafter must be fitted with a toric lens.

This is also shown in FIG. 7A, which is a table 700 illustrating exemplary differences in VA (−10 log MAR) for an astigmatic eye with a 4 mm pupil size and with a prescribed refractive error correction of −3 D and cylinder error 702 when wearing: (1) a single-vision lens having an apodization profile (e.g., like the non-Gaussian apodized single-vision lens 400 in FIG. 4) with a spherical power corresponding to the spherical equivalent power for the prescribed refractive error; as compared to when wearing (2) a toric lens 704 without apodization with a spherical power and cylinder power corresponding to the prescribed refractive error and cylinder error. As shown in FIG. 7A, for a cylinder error 702 of 0.75 D, the VA is 0.1 line improved in the non-Gaussian apodized single-vision lens vs. the toric lens 704. For a cylinder error 702 of 1.0 D, the VA is only 0.1 line decreased in the non-Gaussian apodized single-vision lens vs. the toric lens 704. For a cylinder error 702 of 1.25 D, the VA is only-0.4 line decreased in the non-Gaussian apodized single-vision lens vs. the toric lens 704. For a cylinder error 702 of 1.5 D, the VA is 0.6 line decreased in the non-Gaussian apodized single-vision lens vs. the toric lens 704. A VA that is decreased by more than 0.5 line may not be acceptable, and thus in this example, it may be desired to fit a toric patient with the non-Gaussian apodized single-vision lens up to 1.25 D cylinder error as the designated cylinder error label power limit. However, this is still better than a non-apodized single-vision lens that may only be able to be used to fit a patient with a reduced cylinder error (e.g., up to only 0.75 D cylinder error), and thereafter must be fitted with a toric lens.

Thus, if it is determined that the astigmatic eye has a cylinder error correction less than the designated cylinder error label power (e.g., <=1.25 D) such that the astigmatic eye is fitted with an apodized single-vision lens, the astigmatic eye can be fitted with the apodized single-vision lens as a spherical equivalent lens as opposed to a toric lens and still achieve either an improved VA or acceptable tradeoff in VA for the benefit of increased wear comfort.

Alternatively, if it is determined that the astigmatic eye has a cylinder error correction less than the designated cylinder error label power (e.g., <=1.25 D) such that the astigmatic eye is fitted with an apodized single-vision lens, the astigmatic eye can be fitted with the apodized single-vision lens as an actual spherical lens (not a spherical equivalent lens) as opposed to a toric lens and still achieve either an improved VA or acceptable tradeoff in VA for the benefit of increased wear comfort.

In this regard, FIG. 7B is a table 706 illustrating exemplary differences in VA for an astigmatic eye with a prescribed refractive error and cylinder error 702 when wearing: (1) a single-vision lens having an apodization profile (e.g., like the non-Gaussian apodized single-vision lens 400 in FIG. 4) with a spherical power (not spherical equivalent lens) corresponding to the actual spherical power for the prescribed refractive error; as compared to when wearing (2) the toric lens 704 without apodization with a spherical power and cylinder power corresponding to the prescribed refractive error and cylinder error. As shown in FIG. 7B, for a cylinder error 702 of 0.75 D, the VA is not degraded in the non-Gaussian apodized single-vision lens vs. the toric lens 704. For a cylinder error 702 of 1.0 D, the VA is only 0.2 line decreased in the non-Gaussian apodized single-vision lens vs. the toric lens 704. For a cylinder error 702 of 1.25 D, the VA is only 0.5 line decreased in the non-Gaussian apodized single-vision lens vs. the toric lens 704. For a cylinder error 702 of 1.5 D, the VA is 0.6 line decreased in the non-Gaussian apodized single-vision lens vs. the toric lens 704. A VA that is decreased by more than 0.5 line may not be acceptable, and thus in this example, it may be desired to fit a toric patient with the non-Gaussian apodized single-vision lens up to 1.25 D cylinder error as the designated cylinder error label power limit. However, this is still better than a non-apodized single-vision lens that may only be able to be used to fit a patient with a reduced cylinder error (e.g., up to only 0.75 D cylinder error), and thereafter must be fitted with a toric lens.

Figure 8:
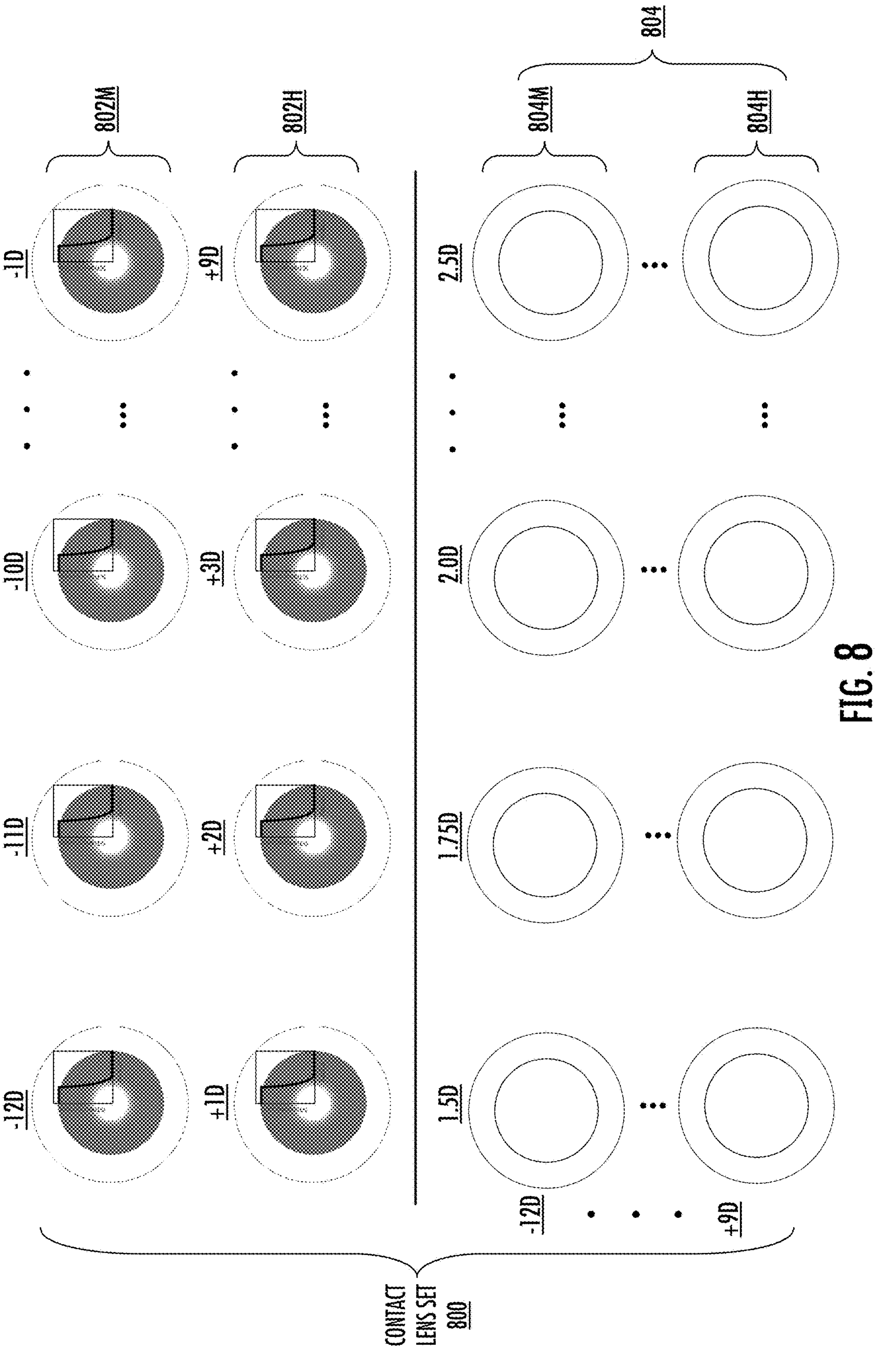
FIG. 8 is an exemplary contact lens set used to correct vision for astigmatic patients, wherein the contact lens set includes a first subset of lenses that are non-Gaussian apodized single-vision lenses, like the apodized single-vision lens in FIG. 4, having a spherical power and a non-Gaussian apodization transmission profile selected for an astigmatic eye with a cylinder power than a designated cylinder error label power, and a second subset of lenses that are non-apodization toric lenses having a spherical power and cylinder power selected for an astigmatic eye with a cylinder error greater than the designated cylinder error label power.

Because it has been determined that an apodized single-vision lens can be provided to be fitted to a toric patient with up to a designated cylinder error label power (e.g., <=1.25 D) and still achieve either an improved VA or acceptable tradeoff in VA vs. a toric lens, but for the benefit of increased wear comfort, it may be desired to provide a contact lens set that includes such apodized single-vision lenses for different refractive error correction prescriptions over different cylinder error correction prescriptions up to the designated cylinder error label power. In this regard, FIG. 8 is an exemplary contact lens set 800 used to correct vision for astigmatic patients. The contact lens set includes a first subset of non-Gaussian apodized single-vision lenses 802, like the non-Gaussian apodized single-vision lens 400 in FIG. 4, having a spherical power and a non-Gaussian apodization transmission profile selected for an astigmatic eye with a cylinder power less than a designated cylinder error label power (e.g., <=1.25D). The first subset of non-Gaussian apodized single-vision lenses 802 can include one lens or more than one lens having a spherical power and a non-Gaussian apodization transmission profile selected for an astigmatic eye with a cylinder power less than a designated cylinder error label power. The contact lens set 800 also includes a second subset of toric lenses 804 that are non-apodization toric lenses having a spherical power and cylinder power selected for an astigmatic eye with a cylinder error greater than the designated cylinder error label power (e.g., >1.25 D). The second subset of toric lenses 804 can include one lens or more than one lens that are non-apodization toric lenses having a spherical power and cylinder power selected for an astigmatic eye with a cylinder error greater than the designated cylinder error label power. The second subset of toric lenses 804 is provided in case the VA trade off in fitting an asigmatic eye with the apodized single-vision lens is greater than desired or unacceptable to the patient.

As shown in FIG. 8, the first subset of non-Gaussian apodized single-vision lenses 802 includes the non-Gaussian apodized single-vision lenses that includes stock keeping units (SKUs) that are designed to be used to fit a toric patient having a cylinder error up to designated cylinder error label power (e.g., <=1.25 D) as either a spherical equivalent lens or spherical lens. The first subset of non-Gaussian apodized single-vision lenses 802 also include myopic-correcting non-Gaussian apodized single-vision lenses 802M for various myopic refractive powers from −12 D to −1 D, and hyperopic-correcting non-Gaussian apodized single-vision lenses 802H for a various of hyperopic refractive powers from +1 D to +9 D. Note that any desired number of SKUs of myopic-correcting non-Gaussian apodized single-vision lenses 802M and hyperopic-correcting non-Gaussian apodized single-vision lenses 802H for a various respective myopic and hyperopic spherical powers can be provided in the first subset of non-Gaussian apodized single-vision lenses 802.

As also shown in FIG. 8, the second subset of toric lenses 804 including toric lenses includes stock keeping units (SKUs) for different cylinder powers of 0.75 D, 1.0 D, and 1.25 D (or up to the designated cylinder error label power (e.g., >1.25 D)). The toric lenses 804 in the second subset of toric lenses 804 have a stabilization mechanism to maintain rotational stability of the toric lens 804 on an eye. The second subset of toric lenses 804 also includes myopic-correcting toric lenses 804M for various myopic refractive powers starting at −12 D, and hyperopic-correcting toric lenses 804H for various hyperopic refractive powers starting up to +9 D. Note that any desired number of SKUs of myopic-correcting toric lenses 804M and hyperopic-correcting toric lenses 804H for a various respective myopic and hyperopic spherical powers can be provided in the second subset of toric lenses 804.

Figure 9:
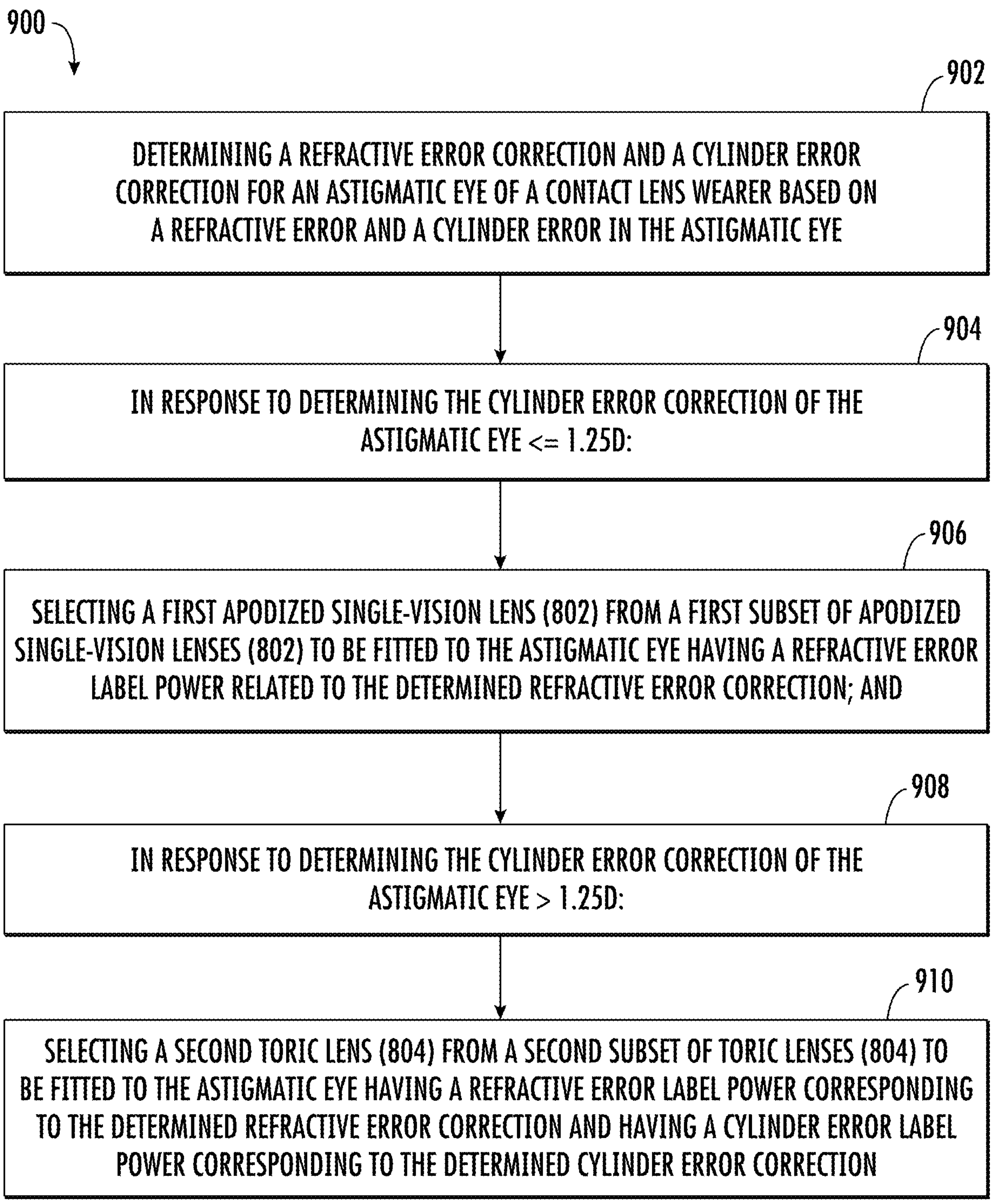
FIG. 9 is a flowchart illustrating an exemplary fitting process for fitting a lens(es) to an astigmatic eye of a toric patient from a contact lens set based on the refractive error correction and cylinder error correction need, wherein the contact lens set includes a first subset of lenses that are apodized single-vision lenses having a spherical power and an apodization profile selected for an astigmatic eye with a cylinder error correction less than a designated cylinder error label power and second subset of lenses that are non-apodization toric lenses having a spherical power for correcting refractive error of the astigmatic eye and having a cylinder power greater than the designated cylinder error label power for correcting cylinder error.

FIG. 9 is a flowchart illustrating an exemplary fitting process 900 of fitting a lens(es) to an astigmatic patient from a contact lens set, such as contact lens set 800 in FIG. 8, based on the refractive error correction and cylinder error correction needed. As discussed below, the fitting process 900 of fitting a lens(es) to an astigmatic eye of a patient from the contact lens set includes fitting a lens to the astigmatic eye from a first subset of lenses that are apodized single-vision lenses (e.g., like the first subset of apodized single-vision lenses 802 in FIG. 8 with non-Gaussian apodized single-vision lenses like the non-Gaussian apodized single-vision lens 400 in FIG. 4) having a spherical power related to the refractive error of the astigmatic eye, and an apodization profile selected for fitting in an astigmatic eye with a cylinder error less than a designated cylinder error label power (e.g., <=1.25 D). The fitting process 900 of fitting a lens(es) to an astigmatic eye from the contact lens set also includes fitting a lens to the patient from a second subset of lenses (e.g., like the second subset of toric lenses 804 in FIG. 8) that are non-apodization toric lenses having a spherical power and cylinder power selected for the astigmatic eye with a cylinder error correction greater than the designated cylinder error label power (e.g., >1.25 D) and having a spherical power to substantially correct refractive error corresponding to the refractive error of the astigmatic eye. When the fitting process 900 in FIG. 9 calls for fitting an astigmatic eye with an apodized single-vision lens from the first subset of lenses when the cylinder error of the astigmatic eye is less than the designated cylinder error label power, the astigmatic eye can be fitted with the apodized single-vision lens as either a spherical equivalent lens related to the refractive error of the astigmatic eye or an actual spherical lens corresponding to the refractive error of the astigmatic eye.

In this regard, the fitting process 900 in FIG. 9 is discussed with regard to the contact lens set 800 in FIG. 8, but such is not limiting. In this regard, as shown in FIG. 9, the fitting process 900 includes determining a refractive error correction and a cylinder error correction for an astigmatic eye of a contact lens wearer based on the refractive error and the cylinder error in the astigmatic eye (block 902 in FIG. 9). In response to determining the cylinder error correction of the astigmatic eye being less than or equal to a designated cylinder error label power (e.g., <=1.25D) (block 904 in FIG. 9), the fitting process 900 includes selecting a first apodized single-vision lens 802 from a first subset of apodized single-vision lenses 802 to be fitted to the astigmatic eye having a refractive error label power related to the determined refractive error correction (block 906 in FIG. 9). The refractive error label power related to the determined refractive error correction can either be a spherical equivalent to the determined refractive error correction of the astigmatic eye or a spherical power directly corresponding to the determined refractive error correction of the astigmatic eye.

However, in response to determining the cylinder error correction of the astigmatic eye is greater than the designated cylinder error label power (e.g., >1.25D) (block 908 in FIG. 9), the fitting process 900 includes selecting a second, toric lens 804 from a second subset of toric lenses 804 to be fitted to the astigmatic eye having a refractive error label power corresponding to the determined refractive error correction of the astigmatic eye and having a cylinder error label power corresponding to the determined cylinder error correction of the astigmatic eye (block 910 in FIG. 9).

Note that the fitting process 900 in FIG. 9 can be performed for one or both an ocular dexter (OD) and ocular sinister (OS) astigmatic eye. In this regard, the fitting process 900 could determine an OD and/or OS refractive error correction and an OD and/or OS cylinder error correction for an OD and/or OS astigmatic eye of a contact lens wearer based on the OD and/or OS refractive error and the OD and/or OS cylinder error in the respective OD and/or OS astigmatic eye. In response to determining the OD and/or OS cylinder error correction of the respective OD and/or OS astigmatic eye being less than or equal to a designated cylinder error label power (e.g., <=1.25D), the fitting process includes selecting a first apodized single-vision lens 802 from a first subset of apodized single-vision lenses 802 to be fitted to the OD and/or OS astigmatic eye having a refractive error label power related to the determined respective OD and/or OS refractive error correction (block 906 in FIG. 9). The refractive error label power related to the respective determined OD and/or OS refractive error correction can either be a spherical equivalent to the determined refractive error correction of the OD and/or OS astigmatic eye or a spherical power directly corresponding to the determined respective OD and/or OS refractive error correction of the OD and/or OS astigmatic eye.

However, in response to determining the OD and/or OS cylinder error correction of the respective OD and/or OS astigmatic eye is greater than the designated cylinder error label power (e.g., >1.25D), the fitting process includes selecting a second toric lens 804 from a second subset of toric lenses 804 to be fitted to the astigmatic eye having a refractive error label power corresponding to the determined respective OD and/or OS refractive error correction of the respective OD and/or OS astigmatic eye and having a cylinder error label power corresponding to the determined respective OD and/or OS cylinder error correction of the astigmatic eye.

Further, if a toric patient complains of reduced VA in an astigmatic eye fitted with an apodized single-vision lens, such as an apodized single-vision lens 802 from the first subset of apodized single-vision lenses 802 in FIG. 8, when their cylinder error is less than or equal to the designated cylinder error label power (e.g., <=1.25D), the astigmatic eye can be refitted with a toric lens that has a cylinder power corresponding to the cylinder error of the astigmatic eye. In this regard, for example, the second subset of toric lenses 804 in FIG. 8 can be expanded with a separate third lens set provided that the third lens set has the refractive error correction SKUs for cylinder power less than or equal to the designated cylinder error label power (e.g., <=1.25D) that can also be fitted to an astigmatic eye. The patient can then determine if the VA from the toric lens from the third lens set is acceptable.

Also, if a toric patient complains of discomfort from a fitted toric lens, such as a toric lens 804 from the second subset of toric lenses 804 in FIG. 8, in an astigmatic eye when their cylinder error is greater than or equal to the designated cylinder error label power (e.g., >1.25D), the astigmatic eye can be refitted with an apodized single-vision lens, such as an apodized single-vision lens 802 from the first subset of apodized single-vision lenses 802 in FIG. 8. The patient can then determine if the VA from the apodized single-vision lens 802 is acceptable.

Figure 10:
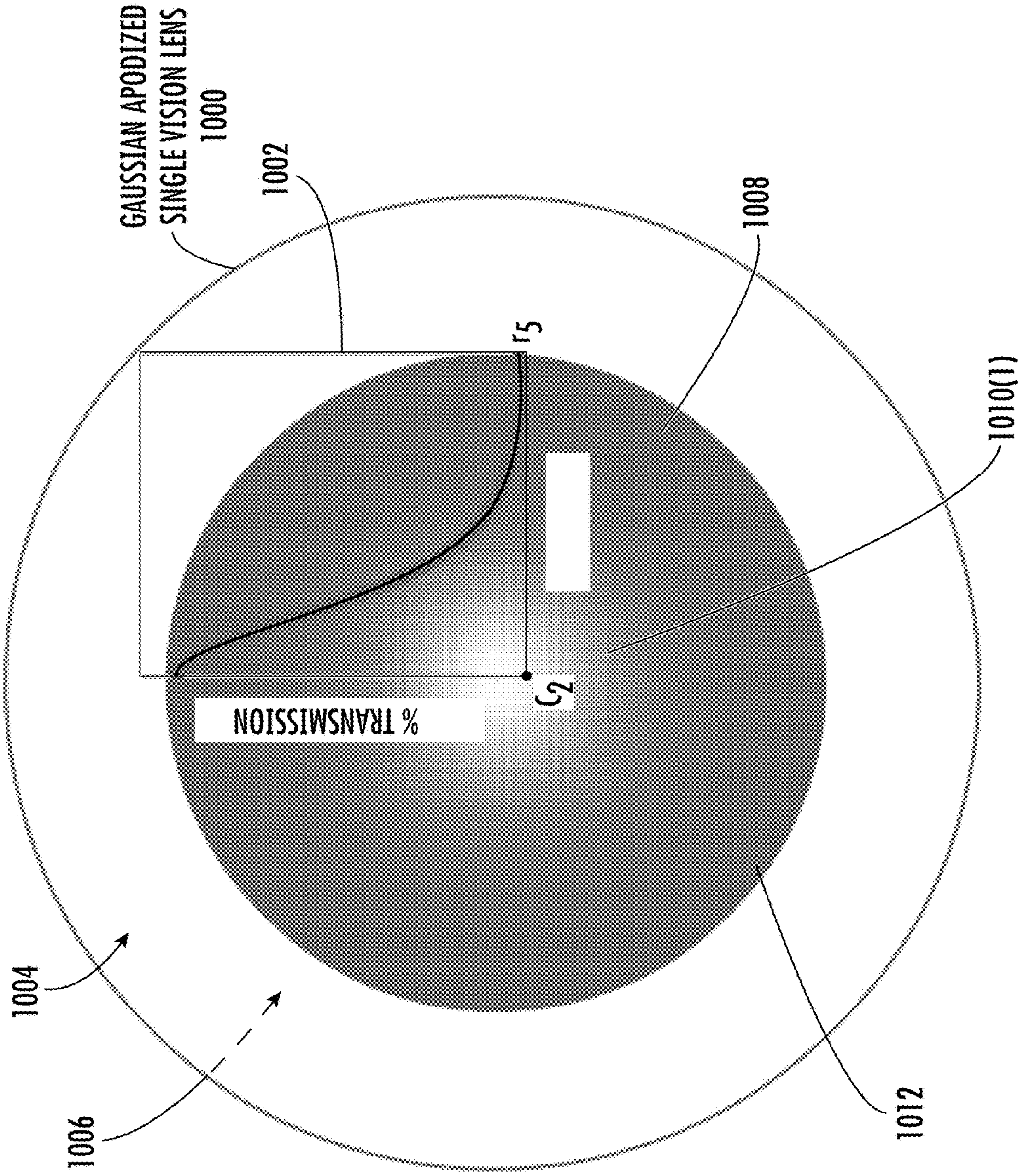
FIG. 10 is a diagram of an exemplary apodized single-vision lens that includes an exemplary Gaussian apodization transmission profile that filters light transmission relative to the radius of the spherical lens and that can be used as a spherical lens or spherical equivalent lens for an astigmatic eye to provide refractive error correction.

FIG. 10 is a diagram of another exemplary single-vision lens 1000 that has a refractive error correction and includes an exemplary apodization profile 1002, which is a Gaussian apodization transmission profile. The Gaussian apodized single-vision lens 1000 is an example of a Gaussian apodized single-vision lens that can be provided for use in an astigmatic eye(s) of a patient who has a lower cylinder error less than designated cylinder error label power for the contact lens set (e.g., <=1.25 diopter (D)). The Gaussian apodized single-vision lens 1000 can be used as a spherical lens or spherical equivalent lens for an astigmatic eye to provide refractive error correction. Either a front surface 1004 or a back surface 1006 of an optical zone 1008 of the Gaussian apodized single-vision lens 1000 can have a spherical power to provide for refractive error correction according to the spherical power profile provided in the Gaussian apodized single-vision lens 1000.

As shown in FIG. 10, the apodization profile 1002 in the Gaussian apodized single-vision lens 1000 filters light transmission through an optical zone 1008 of the Gaussian apodized single-vision lens 1000 relative to the radius r of the Gaussian apodized single-vision lens 1000 from its center axis $C_2$. In this example, the Gaussian apodization transmission profile 1002 includes a first transmission zone 1010(1) in the optical zone 1008 between the center axis $C_2$ and the radius $r_5$ of the optical zone 1008 that has a curved profile to reduce the transmission of light of the Gaussian apodized single-vision lens 1000 decreasingly as a function of increased radius towards an edge 1012 of the optical zone 1008.

Figures 11A, 11B:
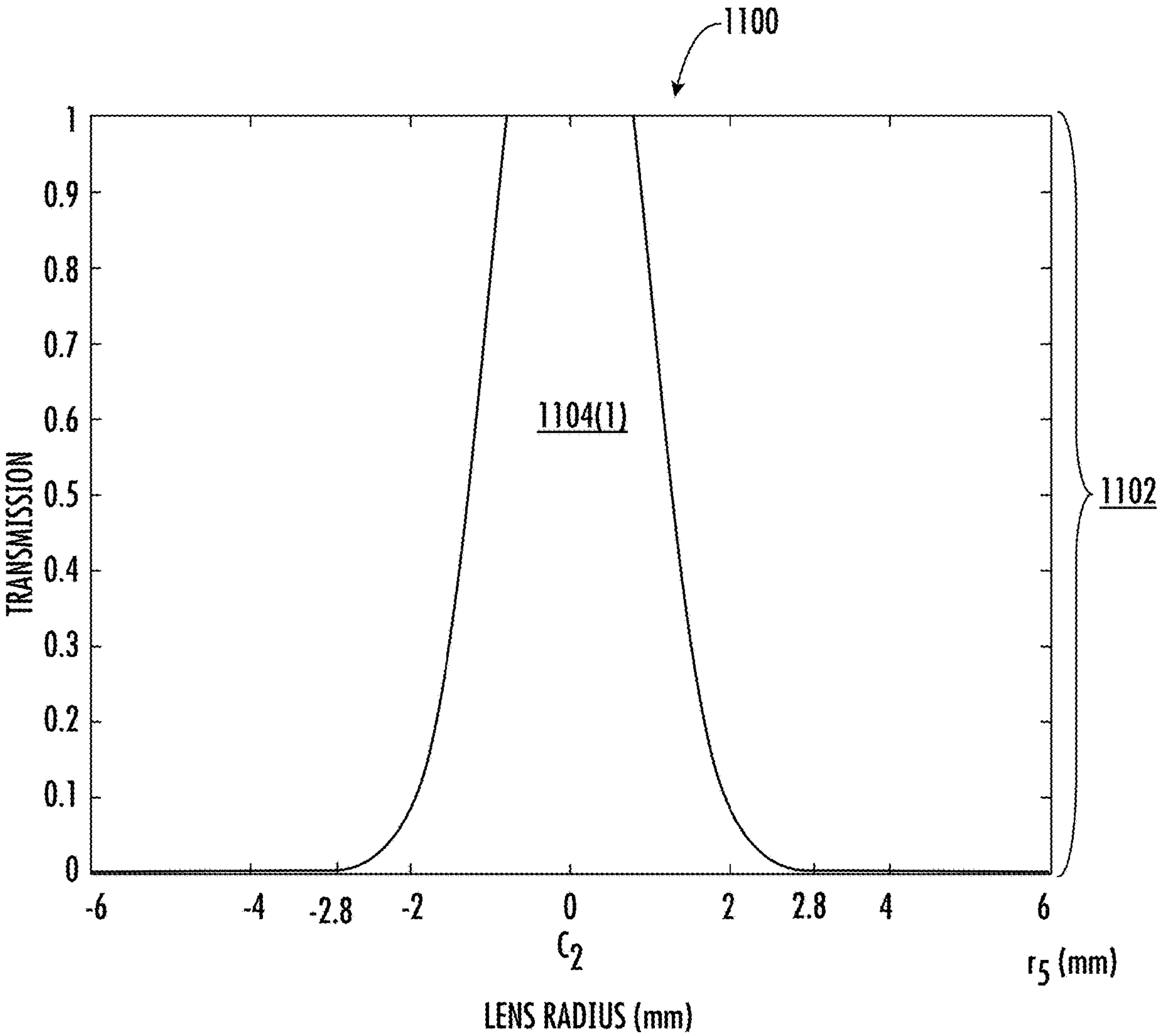
FIG. 11A is a graph of another exemplary Gaussian apodization transmission profile with a center flat transmission zone that can be provided in the apodized single-vision lens in FIG. 10.
FIG. 11B is a formula of the Gaussian apodization transmission profile in FIG. 11A as a function of the radius of the apodized single-vision lens.

FIG. 11A is a transmission graph 1100 of the exemplary Gaussian apodization transmission profile 1002 (with center flat top/transmission) that can be provided as the apodization profile 1102 in the Gaussian apodized single-vision lens 1000 in FIG. 10. As shown in FIG. 11A, the transmission graph 1100 plots the percentage of light transmission as a function of radius $r_5$ from a center axis $C_2$. The Gaussian apodization transmission profile 1102 includes a first transmission region 1104(1) where light is transmitted at 100% starting at the center axis $C_2$ to approximately a radius of approximately 0.8 mm, and then decreases to approximately 0.5% (e.g., 0.497%) light transmission at a radius from the center axis $C_2$ of approximately 2.8 mm. FIG. 11B is a formula 1106 for light transmission (T) as a function of radius (r) (T/r) for the exemplary Gaussian apodization transmission profile 1102 in FIG. 11A. Note that alternatively, a regular Gaussian apodization transmission profile could be provided in an apodized single-vision lens that does not have a center flat top.

Figure 12:
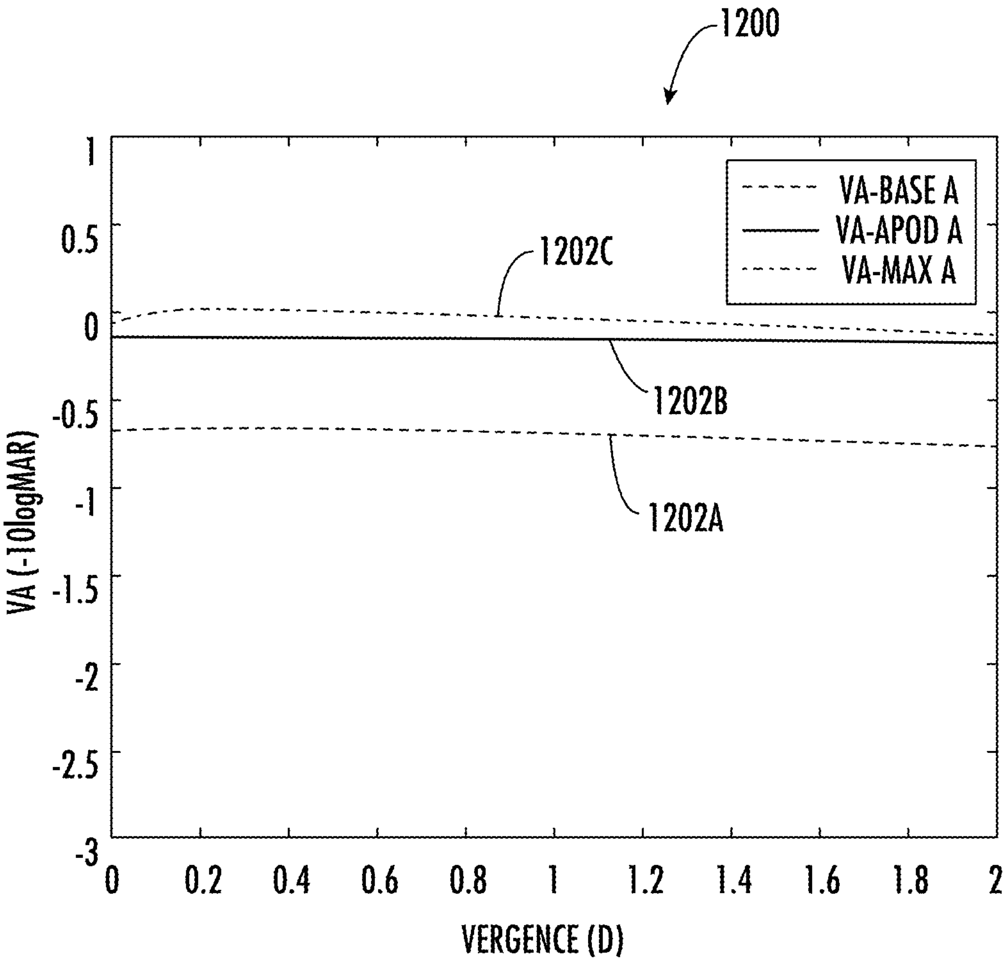
FIG. 12 is a graph illustrating exemplary VAs of a similar single-vision lens without apodization, an apodized single-vision lens in FIG. 10, and an exemplary non-apodization toric lens, all as a function of vergence.

FIG. 12 shows a graph 1200 of a VA curve 1202A for a patient wearer that has a cylinder error of 0.75 D fitted with a single-vision lens without apodization (VA_Base), a VA curve 1202B for the patient wearer fitted with a Gaussian apodized single-vision lens (e.g., like the Gaussian apodized single-vision lens 1000 in FIG. 10) (VA_Apod), and VA curve 1202C for the patient wearer fitted with a non-apodization toric lens with a cylinder power of 0.75 D (VA_Max), all as a function of vergence (D). As shown in FIG. 12, there is more than a 0.6 line of VA improvement in the non-apodization toric lens with a cylinder power of 0.75 D (VA_MaxA) over the single-vision lens without apodization (VA_BaseA). Thus, VA can be improved by fitting the patient with the non-apodization toric lens with a cylinder power of 0.75 D (VA_MaxA). However, as also shown in FIG. 12, while there is not a VA improvement in the Gaussian apodized single-vision lens (e.g., like the Gaussian apodized single-vision lens 1000 in FIG. 10) (VA_Apod) over the non-apodization toric lens with a cylinder power of 0.75 D (VA_Max), the difference in VA between these lenses is less than 0.5 line VA. Thus, by fitting a patient having 0.75 D cylinder error with a Gaussian apodized single-vision lens (VA_Apod) (e.g., like the Gaussian apodized single-vision lens 1000 in FIG. 10), the patient may enjoy an increased comfort over the non-apodization toric lens with a cylinder power of 0.75 D with a stabilization mechanism (VA_MaxB), with very little or minimal tradeoff in VA. As an example, the patient with a cylinder error of up to or equal to 1.25 D may enjoy increased comfort with a Gaussian apodized single-vision lens (VA_Apod) (e.g., like the Gaussian apodized single-vision lens 1000 in FIG. 10), over the non-apodization toric lens with a stabilization mechanism (VA_MaxB), with very little or minimal tradeoff in VA. Also, fitting a patient having 0.75 D cylinder error with the non-Gaussian apodized single-vision lens (VA_ApodA)

(e.g., like the Gaussian apodized single-vision lens 1000 in FIG. 10), can result in at least a 0.5 line VA improvement over the single-vision lens without apodization (VA_BaseA).

Figure 13:
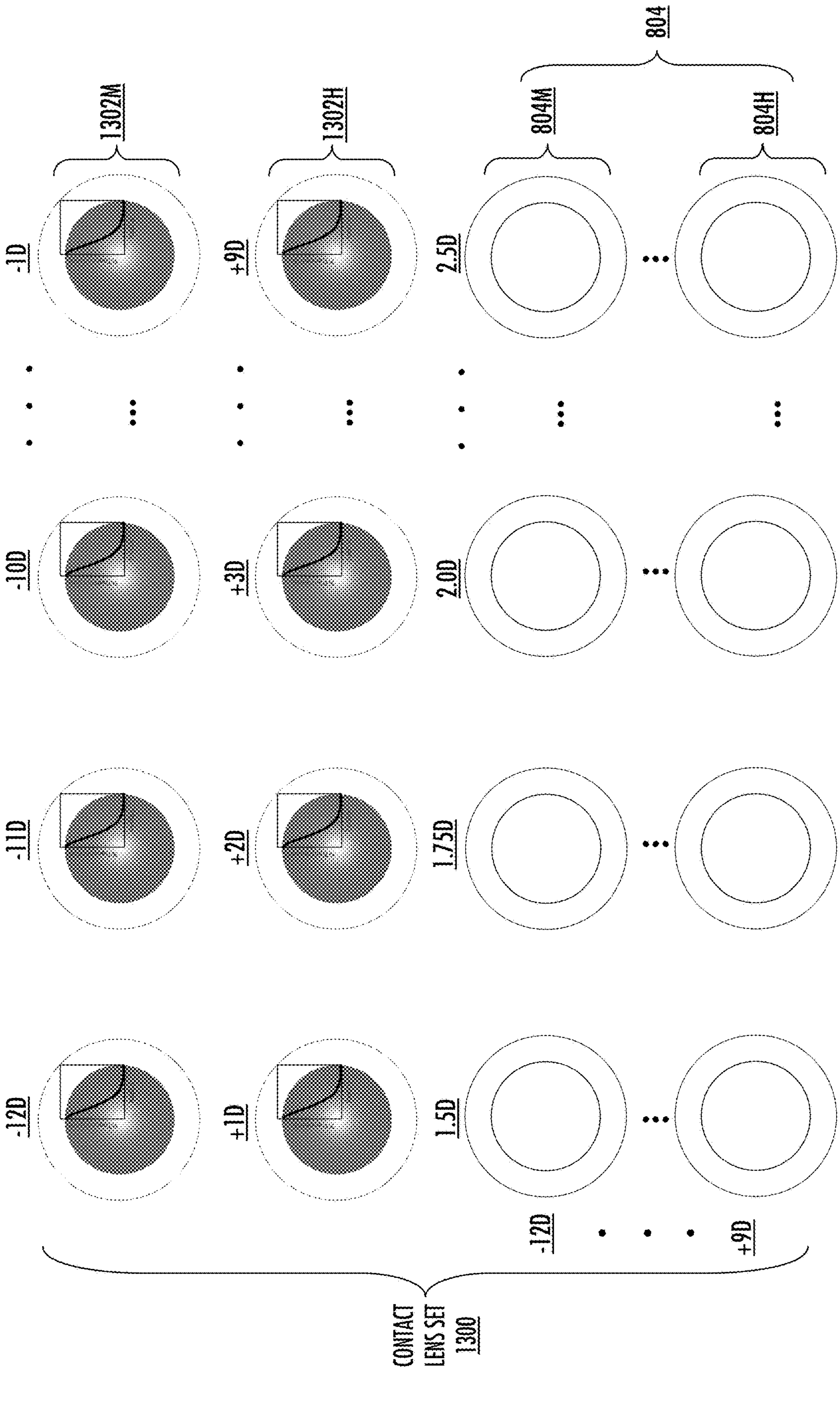
FIG. 13 is an exemplary contact lens set used to correct vision for astigmatic patients, wherein the contact lens set includes a first subset of lenses that are Gaussian apodized single-vision lenses like the Gaussian apodized single-vision lens in FIG. 10 having a spherical power and a Gaussian apodization transmission profile selected for an astigmatic eye with a cylinder error correction less than a designated cylinder error label power and a second subset of lenses that are non-apodization toric lenses having a spherical power and cylinder power selected for an astigmatic eye with a cylinder error correction greater than the designated cylinder error label power.

Because it has been determined that a Gaussian apodized single-vision lens can be provided to be fitted to a toric patient with up to a designated cylinder error label power (e.g., <=1.25 D) and still achieve either an improved VA or acceptable tradeoff in VA vs. a toric lens, but for the benefit of increased wear comfort, it may be desired to provide a contact lens set that includes such Gaussian apodized single-vision lenses for different refractive error correction prescriptions over different cylinder error correction prescriptions up to the designated cylinder error label power. In this regard, FIG. 13 is an exemplary contact lens set 1300 used to correct vision for astigmatic patients. The contact lens set includes a first subset of Gaussian apodized single-vision lenses 1302 that are apodized single-vision lens, like the Gaussian apodized single-vision lens 1000 in FIG. 10, having a spherical power and a Gaussian apodization transmission profile selected for an astigmatic eye with a cylinder power less than a designated cylinder error label power (e.g., <=1.25D). The first subset of Gaussian apodized single-vision lenses 1302 can include one lens or more than one lens having a spherical power and a Gaussian apodization transmission profile selected for an astigmatic eye with a cylinder power less than a designated cylinder error label power. The fitting process 900 in FIG. 9 can also be performed with the contact lens set 1300 in FIG. 13 as another example.

As shown in FIG. 13, the first subset of Gaussian apodized single-vision lenses 1302 includes the Gaussian apodized single-vision lenses that include stock keeping units (SKUs) that are designed to be used to fit a toric patient having a cylinder error up to designated cylinder error label power (e.g., <=1.25 D) as either a spherical equivalent lens or spherical lens. The first subset of Gaussian apodized single-vision lenses 1302 also includes myopic-correcting Gaussian apodized single-vision lenses 1302M for various myopic refractive powers from −12 D to −1 D and hyperopic-correcting Gaussian apodized single-vision lenses 1302H for a various of hyperopic refractive powers from +1 D to +9 D. Note that any desired number of SKUs of myopic-correcting Gaussian apodized single-vision lenses 1302M and hyperopic-correcting Gaussian apodized single-vision lenses 1302H for a various respective myopic and hyperopic spherical powers can be provided in the first subset of Gaussian apodized single-vision lenses 1302.

The contact lens set 1300 also includes the second subset of toric lenses 804 discussed previously with regard to FIG. 8 as part of the contact lens set 800 therein, which are non-apodization toric lenses having a spherical power and cylinder power selected for an astigmatic eye with a cylinder error greater than the designated cylinder error label power (e.g., >1.25 D). The second subset of toric lenses 804 can include one lens or more than one lens having a spherical power and cylinder power selected for an astigmatic eye with a cylinder error greater than the designated cylinder error label power. The second subset of toric lenses 804 is provided in case the VA trade-off in fitting an asigmatic eye with the apodized single vision lens is greater than desired or acceptable to the patient.

Note that although examples disclosed above include lens sets that include (1) apodized single-vision lenses from the first subset of lenses in the contact lens set provided for use in an astigmatic eye(s) of a patient that has a lower cylinder error less than the designated cylinder error label power for the contact lens set (e.g., <=1.25 diopter (D)), and (2) non-apodization toric lenses from the second subset of lenses of the contact lens set are provided for use in an astigmatic eye(s) of a patient with a higher cylinder error greater than the designated cylinder error label power for the contact lens set (e.g., >1.25 diopter (D)), such is not limiting. The designated cylinder error label power is disclosed as an example of 1.25 D, but the designated cylinder error label power could also be adjusted from 1.25 D. For example, the designated cylinder error label power could be any cylinder error label power desired, including but not limited to between 1.25D and 2.0D, such as 1.5 D, 1.75 D, and 2.0 D as examples. Apodized single-vision lenses that include an apodization profile for use in an astigmatic eye(s) of a patient that has a lower cylinder error less than such alternative designated cylinder error label powers can still reduce or mask transmitted light through peripheral regions of the spherical lens to still reduce the effective pupil size of a patient, thus reducing aberrations in the overall wavefront for the lens wearer with the effect of improving vision in the astigmatic patient with either a minimal or no tradeoff in visual acuity (VA) for astigmatic patients.

Further, in another exemplary aspect, the second subset of lenses of the contact lens set that are provided for use in an astigmatic eye(s) of a patient with a higher cylinder error greater than the designated cylinder error label power for the contact lens set does not have to be non-apodized toric lenses. Such a second subset of lenses could be apodized toric lenses that provide both toric correction and an apodized profile, as opposed to non-apodized toric lenses. One benefit of such a contact lens set with the second subset of apodized toric lenses for use in an astigmatic eye(s) of a patient with a higher cylinder error greater than the designated cylinder error label power for the contact lens is a cosmetic benefit for bilateral patient wear that has cylinder error above and below the designated cylinder error label power in their eyes, such that the patient would be fitted with a lens from each of the first and second subset of lenses in each eye. By both the first and second subsets of lenses being apodized, the lenses will look similar in each eye, as opposed to a bilateral wearer that would appear to have a clear lens in one eye and a darker, apodized lens in the other eye. Further, the second subset of lenses being apodized toric lenses for use in an astigmatic eye(s) of a patient with a higher cylinder error greater than the designated cylinder error label power can also have the benefit of reduced higher-order spherical aberrations in higher cylinder corrected eyes over correction of cylinder error in large pupils. Note that the aspects described above are in regard to exemplary contact lens sets, contact lens pairs, and individual contact lenses, but not that such examples are not limited to contact lenses but could be applied to any type of lenses and related contact lens sets and pairs. Also note that other apodization profiles can be provided for apodized single-vision lenses discussed herein and that the apodized single-vision lenses discussed herein are not limited to the disclosed non-Gaussian and Gaussian apodization transmission profiles disclosed herein.

It is important to note that the lens designs of the present disclosure may be incorporated into any number of different contact lenses formed from any number of materials. Specifically, the lens design of the present disclosure may be utilized in any of the contact lenses described herein, including, but not limited to, daily wear soft contact lenses, rigid gas permeable contact lenses, bifocal contact lenses, toric contact lenses, and hybrid contact lenses. In addition, although the disclosure is described with respect to contact lenses, it is important to note that the concept of the present disclosure may be utilized in spectacle lenses, intraocular lenses, corneal inlays, and on lays.

It is to be understood that the disclosure is not to be limited to the specific aspects disclosed and that modifications and other aspects are intended to be included within the scope of the appended claims and their equivalents. Although specific terms are employed herein, they are used in a generic and descriptive sense only and not for purposes of limitation. Upon reading the following description in light of the accompanying drawing figures, those skilled in the art will understand the concepts of the disclosure and will recognize applications of these concepts not particularly addressed herein. The aspects set forth below represent the necessary information to enable those skilled in the art to practice the disclosure and illustrate the best mode of practicing the disclosure. It should be understood that these concepts and applications fall within the scope of the disclosure and the accompanying claims. Many modifications and other embodiments of the disclosure set forth herein will come to mind to one skilled in the art to which the disclosure pertains, having the benefit of the teachings presented in the foregoing descriptions and the associated drawings. Although shown and described in what is believed to be the most practical and specific aspects disclosed, modifications and other aspects are intended to be included within the scope of the appended claims. It is apparent that departures from specific designs and methods described and shown will suggest themselves to those skilled in the art and may be used without departing from the spirit and scope of the disclosure.

Implementation examples are described in the following numbered clauses:

1. A method of fitting a contact lens of a contact lens set for astigmatic patients comprising a plurality of lenses, each having a spherical power to substantially correct refractive error corresponding to a unique refractive error label power, comprising:
   - determining a refractive error correction and a cylinder error correction for an astigmatic eye of a contact lens wearer based on a refractive error and a cylinder error in the astigmatic eye;
   - in response to determining the cylinder error correction of the astigmatic eye <=1.25D:
     - selecting a first lens from a first subset of lenses to be fitted to the astigmatic eye having a refractive error label power related to the determined refractive error correction; and
   - in response to determining the cylinder error correction of the astigmatic eye >1.25D:
     - selecting a second lens from a second subset of lenses to be fitted to the astigmatic eye having a refractive error label power corresponding to the determined refractive error correction and having a cylinder error label power corresponding to the determined cylinder error correction;
   - wherein:
     - the first subset of lenses of the plurality of lenses each comprises a single vision lens further having an apodization profile; and
     - the second subset of lenses of the plurality of lenses each comprises a non-apodized toric lens further having a cylinder power to substantially correct cylinder error corresponding to a unique cylinder error label power >1.25 diopter (D).

2. The method of clause 1, wherein selecting the first lens from the first subset of lenses comprises:
   - selecting the first lens from the first subset of lenses to be fitted to the astigmatic eye having refractive error label power of a spherical equivalent of the determined refractive error correction and the determined cylinder error correction.

3. The method of clause 1, wherein selecting the first lens from the first subset of lenses comprises:
   - selecting the first lens from the first subset of lenses to be fitted to the astigmatic eye having refractive error label power corresponding to the determined refractive error correction.

4. The method of any of clause 1 to clause 3, further comprising, in response to determining the cylinder error correction of the astigmatic eye <=1.25D:
   - receiving feedback from the contact lens wearer based on a perceived visual acuity of vision when wearing the selected first lens in the astigmatic eye; and
   - in response to the feedback indicating the perceived visual acuity of vision not being acceptable to the contact lens wearer:
     - selecting a third lens from a third subset of lenses of the plurality of lenses to be fitted to the astigmatic eye having a second refractive error label power corresponding to the determined refractive error correction and having a cylinder error label power corresponding to the determined cylinder error correction;
     - each lens in the third subset of lenses comprising a non-apodized toric lens further having a cylinder power to substantially correct cylinder error corresponding to a unique cylinder error label power <=1.25 D.

5. The method of any of clause 1 to clause 4, further comprising, in response to determining the cylinder error correction of the astigmatic eye >1.25D:
   - receiving feedback from the contact lens wearer based on a perceived comfort of when wearing the selected second lens in the astigmatic eye; and
   - in response to the feedback indicating the perceived being acceptable to the contact lens wearer:
     - selecting a first lens from a first subset of lenses of the plurality of lenses to be fitted to the astigmatic eye having a refractive error label power related to the determined refractive error correction.

6. The method of any of clause 1 to clause 5, wherein:
   - determining the refractive error correction for the astigmatic eye of the contact lens wearer comprises:
     - determining an ocular dexter (OD) refractive error correction for an OD astigmatic eye of the contact lens wearer; and
     - determining an ocular sinister (OS) refractive error correction for an OS astigmatic eye of the contact lens wearer;
   - determining the cylinder error correction for the contact lens wearer comprises:
     - determining an OD cylinder error correction for the OD astigmatic eye; and
     - determining an OS cylinder error correction for the OS astigmatic eye;
   - in response to determining the cylinder error correction of the OD astigmatic eye <=1.25D:
     - selecting a first lens for the OD astigmatic eye from the first subset of lenses to be fitted to the OD astigmatic eye having a refractive error label power related to the determined OD refractive error correction;

in response to determining the cylinder error correction of the OD astigmatic eye >1.25D:

selecting a second lens from the second subset of lenses to be fitted to the OD astigmatic eye having a refractive error label power corresponding to the determined OD refractive error correction and having a cylinder error label power corresponding to the determined OD cylinder error correction;

in response to determining the cylinder error correction of the OS astigmatic eye <=1.25D:

selecting a third lens for the OS astigmatic eye from the first subset of lenses to be fitted to the OS astigmatic eye having a refractive error label power related to the determined OS refractive error correction; and in response to determining the cylinder error correction of the OS astigmatic eye >1.25D:

selecting a fourth lens from the second subset of lenses to be fitted to the OS astigmatic eye having a refractive error label power corresponding to the determined OS refractive error correction and having a cylinder error label power corresponding to the determined OS cylinder error correction.

7. The method of any of clause 1 to clause 6, wherein each lens of the first subset of lenses has a non-Gaussian apodization transmission profile.

8. The method of any of clause 1 to clause 8, wherein the apodization profile in each lens of the first subset of lenses is configured to allow 100% transmission from a center axis to a radius of about 0.7897 millimeters (mm), and a second transmission zone that has a transmission less than 100% and wherein such transmission decreases as a function of increase in the radius.

9. The method of any of clause 1 to clause 8, wherein each lens of the first subset of lenses has a center axis and has a non-Gaussian apodization transmission profile comprising:

$$T(r) = \begin{cases} 1(0 \le r \le 0.7897) \\ 1.2304 * \cos(0.7854 * r)(0.7897 \le r \le 2 \\ 0(r > 2) \end{cases}$$

wherein:

r=radius from the center axis.

10. The method of any of clause 1 to clause 6, wherein each lens of the first subset of lenses has a center axis and a Gaussian apodization transmission profile.

11. The method of any of clause 1 to clause 6, or clause 10, wherein each lens of the first subset of lenses has a center axis and a Gaussian apodization transmission profile comprising:

$$T(r) = \begin{cases} 1(0 \le r \le 0.85) \\ 1.6 * \exp\left\{-\left(\frac{x}{1.166}\right)^2\right\}(0\ ..\ 85 < r \le 4) \\ 0(r > 4) \end{cases}$$

wherein:

r=radius from the center axis.

12. The method of any of clause 1 to clause 11, wherein the non-apodized toric lens in each of the second subset of lenses further comprises a stabilization mechanism to maintain rotational stability of the non-apodized toric lens on eye.

13. A contact lens set for correcting vision in an astigmatic eye of a contact lens wearer, comprising:

a plurality of lenses, each having a spherical power to substantially correct refractive error corresponding to a unique refractive error label power;

wherein:

a first subset of lenses of the plurality of lenses, each having a first optical zone having a first center axis and a first radius extending from the first center axis to a first lens edge, and each comprising a single vision lens further having an apodization profile; and a second subset of lenses of the plurality of lenses each comprises a non-apodized toric lens further having a cylinder power to substantially correct cylinder error corresponding to a unique cylinder error label power >1.25 diopter (D);

wherein the apodization profile in each lens of the first subset of lenses comprises a first transmission zone that allows 100% transmission from the first center axis to the first radius of about 0.7897 millimeters (mm), and a second transmission zone that has a transmission less than 100% and wherein such transmission decreases as a function of increase in the first radius.

14. The contact lens set of clause 13, wherein the apodization profile of each first lens of the first subset lenses comprises a non-Gaussian apodization transmission profile.

15. The contact lens set of clause 14, wherein the non-Gaussian apodization transmission profile comprises:

$$T(r) = \begin{cases} 1(0 \le r \le 0.7897) \\ 1.2304 * \cos(0.7854 * r)(0.7897 \le r \le 2 \\ 0(r > 2) \end{cases}$$

wherein:

r=radius from the first center axis.

16. The contact lens set of any of clause 13 to clause 15, wherein a front surface of each of the first subset of lenses has the spherical power.

17. The contact lens set of any of clause 13 to clause 15, wherein a back surface of each of the first subset of lenses has the spherical power.

18. The contact lens set of any of clause 13 to clause 15, wherein:

a front or back surface of each of the second subset of lenses has the spherical power; and the other of the front or back surface of each of the second subset of lenses has the cylinder power.

19. The contact lens set of any of clause 13 to clause 18, wherein the non-apodized toric lens in each of the second subset of lenses further comprises a stabilization mechanism to maintain rotational stability of the non-apodized toric lens on eye.

20. The contact lens set of any of clause 13 to clause 19, wherein a front surface of each of the second subset of lenses has the cylinder power.

21. The contact lens set of any of clause 13 to clause 19, wherein a back surface of each of the second subset of lenses has the cylinder power.

22. The contact lens set of any of clause 13 to clause 21, further comprising a third subset of lenses of the plurality of lenses, each comprises a non-apodized toric lens, each having a second cylinder power to substantially correct cylinder error corresponding to a second cylinder error label power <=1.25 D.

What is claimed is:

1. A method of fitting a contact lens of a contact lens set for astigmatic patients comprising a plurality of lenses, each having a spherical power to substantially correct refractive error corresponding to a unique refractive error label power, comprising:

determining a refractive error correction and a cylinder error correction for an astigmatic eye of a contact lens wearer based on a refractive error and a cylinder error in the astigmatic eye;

in response to determining the cylinder error correction of the astigmatic eye <=1.25D:

selecting a first lens from a first subset of lenses to be fitted to the astigmatic eye having a refractive error label power related to the determined refractive error correction; and in response to determining the cylinder error correction of the astigmatic eye >1.25D:

selecting a second lens from a second subset of lenses to be fitted to the astigmatic eye having a refractive error label power corresponding to the determined refractive error correction and having a cylinder error label power corresponding to the determined cylinder error correction;

wherein:

the first subset of lenses of the plurality of lenses each comprises a single vision lens further having an apodization profile; and the second subset of lenses of the plurality of lenses each comprises a non-apodized toric lens further having a cylinder power to substantially correct cylinder error corresponding to a unique cylinder error label power >1.25 diopter (D).

2. The method of claim 1, wherein selecting the first lens from the first subset of lenses comprises:

selecting the first lens from the first subset of lenses to be fitted to the astigmatic eye having refractive error label power of a spherical equivalent of the determined refractive error correction and the determined cylinder error correction.

3. The method of claim 1, wherein selecting the first lens from the first subset of lenses comprises:

selecting the first lens from the first subset of lenses to be fitted to the astigmatic eye having refractive error label power corresponding to the determined refractive error correction.

4. The method of claim 1, further comprising, in response to determining the cylinder error correction of the astigmatic eye <=1.25D:

receiving feedback from the contact lens wearer based on a perceived visual acuity of vision when wearing the selected first lens in the astigmatic eye; and in response to the feedback indicating the perceived visual acuity of vision not being acceptable to the contact lens wearer:

selecting a third lens from a third subset of lenses of the plurality of lenses to be fitted to the astigmatic eye having a second refractive error label power corresponding to the determined refractive error correction and having a cylinder error label power corresponding to the determined cylinder error correction;

each lens in the third subset of lenses comprising a non-apodized toric lens further having a cylinder power to substantially correct cylinder error corresponding to a unique cylinder error label power <=1.25 D.

5. The method of claim 1, further comprising, in response to determining the cylinder error correction of the astigmatic eye >1.25D:

receiving feedback from the contact lens wearer based on a perceived comfort of when wearing the selected second lens in the astigmatic eye; and in response to the feedback indicating the perceived being acceptable to the contact lens wearer:

selecting a first lens from a first subset of lenses of the plurality of lenses to be fitted to the astigmatic eye having a refractive error label power related to the determined refractive error correction.

6. The method of claim 1, wherein:

determining the refractive error correction for the astigmatic eye of the contact lens wearer comprises:

determining an ocular dexter (OD) refractive error correction for an OD astigmatic eye of the contact lens wearer; and determining an ocular sinister (OS) refractive error correction for an OS astigmatic eye of the contact lens wearer;

determining the cylinder error correction for the contact lens wearer comprises:

determining an OD cylinder error correction for the OD astigmatic eye; and determining an OS cylinder error correction for the OS astigmatic eye;

in response to determining the cylinder error correction of the OD astigmatic eye <=1.25D:

selecting a first lens for the OD astigmatic eye from the first subset of lenses to be fitted to the OD astigmatic eye having a refractive error label power related to the determined OD refractive error correction;

in response to determining the cylinder error correction of the OD astigmatic eye >1.25D:

selecting a second lens from the second subset of lenses to be fitted to the OD astigmatic eye having a refractive error label power corresponding to the determined OD refractive error correction and having a cylinder error label power corresponding to the determined OD cylinder error correction;

in response to determining the cylinder error correction of the OS astigmatic eye <=1.25D:

selecting a third lens for the OS astigmatic eye from the first subset of lenses to be fitted to the OS astigmatic eye having a refractive error label power related to the determined OS refractive error correction; and in response to determining the cylinder error correction of the OS astigmatic eye >1.25D:

selecting a fourth lens from the second subset of lenses to be fitted to the OS astigmatic eye having a refractive error label power corresponding to the determined OS refractive error correction and having a cylinder error label power corresponding to the determined OS cylinder error correction.

7. The method of claim 1, wherein each lens of the first subset of lenses has a non-Gaussian apodization transmission profile.

8. The method of claim 1, wherein the apodization profile in each lens of the first subset of lenses is configured to allow 100% transmission from a center axis to a radius of about 0.7897 millimeters (mm), and a second transmission zone that has a transmission less than 100% and wherein such transmission decreases as a function of increase in the radius.

9. The method of claim 1, wherein each lens of the first subset of lenses has a center axis and has a non-Gaussian apodization transmission profile comprising:

$$T(r)=\begin{cases}1(0\leq r\leq 0.7897)\\ 1.2304*\cos(0.7854*r)(0.7897\leq r\leq 2\\ 0(r>2)\end{cases}$$

wherein:

r=radius from the center axis.

10. The method of claim 1, wherein each lens of the first subset of lenses has a center axis and a Gaussian apodization transmission profile.

11. The method of claim 1, wherein each lens of the first subset of lenses has a center axis and a Gaussian apodization transmission profile comprising:

$$T(r)=\begin{cases}1(0\leq r\leq 0.85)\\ 1.6*\exp\left\{-\left(\frac{x}{1.166}\right)^2\right\}(0\ ..\ 85<r\leq 4)\\ 0(r>4)\end{cases}$$

wherein:

r=radius from the center axis.

12. The method of claim 1, wherein the non-apodized toric lens in each of the second subset of lenses further comprises a stabilization mechanism to maintain rotational stability of the non-apodized toric lens on eye.

13. A contact lens set for correcting vision in an astigmatic eye of a contact lens wearer, comprising:

a plurality of lenses, each having a spherical power to substantially correct refractive error corresponding to a unique refractive error label power;

wherein:

a first subset of lenses of the plurality of lenses, each having a first optical zone having a first center axis and a first radius extending from the first center axis to a first lens edge, and each comprising a single vision lens further having an apodization profile; and a second subset of lenses of the plurality of lenses each comprises a non-apodized toric lens further having a cylinder power to substantially correct cylinder error corresponding to a unique cylinder error label power >1.25 diopter (D);

wherein the apodization profile in each lens of the first subset of lenses comprises a first transmission zone that allows 100% transmission from the first center axis to the first radius of about 0.7897 millimeters (mm) and a second transmission zone that has a transmission less than 100% and wherein such transmission decreases as a function of increase in the first radius.

14. The contact lens set of claim 13, wherein the apodization profile of each first lens of the first subset lenses comprises a non-Gaussian apodization transmission profile.

15. The contact lens set of claim 14, wherein the non-Gaussian apodization transmission profile comprises:

$$T(r)=\begin{cases}1(0\leq r\leq 0.7897)\\ 1.2304*\cos(0.7854*r)(0.7897\leq r\leq 2\\ 0(r>2)\end{cases}$$

wherein:

r=radius from the first center axis.

16. The contact lens set of claim 13, wherein a front surface of each of the first subset of lenses has the spherical power.

17. The contact lens set of claim 13, wherein a back surface of each of the first subset of lenses has the spherical power.

18. The contact lens set of claim 13, wherein:

a front or back surface of each of the second subset of lenses has the spherical power; and the other of the front or back surface of each of the second subset of lenses has the cylinder power.

19. The contact lens set of claim 13, wherein the non-apodized toric lens in each of the second subset of lenses further comprises a stabilization mechanism to maintain rotational stability of the non-apodized toric lens on eye.

20. The contact lens set of claim 13, wherein a front surface of each of the second subset of lenses has the cylinder power.

21. The contact lens set of claim 13, wherein a back surface of each of the second subset of lenses has the cylinder power.

22. The contact lens set of claim 13, further comprising a third subset of lenses of the plurality of lenses, each comprises a non-apodized toric lens, each having a second cylinder power to substantially correct cylinder error corresponding to a second cylinder error label power <=1.25 D.

* * * * *